United States Patent
Pecoraro et al.

(10) Patent No.: US 9,430,195 B1
(45) Date of Patent: Aug. 30, 2016

(54) DYNAMIC SERVER GRAPHICS

(75) Inventors: Alexis S. Pecoraro, Huntersville, NC (US); David E. Antila, Oakland, CA (US); Sheppard D. Narkier, Charlotte, NC (US); Paul Renaud, Ottawa (CA)

(73) Assignee: EMC Corporation, Hopkinton, MA (US)

( * ) Notice: Subject to any disclaimer, the term of this patent is extended or adjusted under 35 U.S.C. 154(b) by 693 days.

(21) Appl. No.: 13/044,774

(22) Filed: Mar. 10, 2011

Related U.S. Application Data

(60) Provisional application No. 61/342,651, filed on Apr. 16, 2010.

(51) Int. Cl.
*G06F 15/00* (2006.01)
*G06F 9/45* (2006.01)
*G06F 17/22* (2006.01)
*G06F 17/24* (2006.01)
*G06T 11/60* (2006.01)

(52) U.S. Cl.
CPC ............. *G06F 8/40* (2013.01); *G06F 17/2247* (2013.01); *G06F 17/248* (2013.01); *G06T 11/60* (2013.01)

(58) Field of Classification Search
None
See application file for complete search history.

(56) References Cited

U.S. PATENT DOCUMENTS

| | | |
|---|---|---|
| 7,162,427 B1 | 1/2007 | Myrick et al. |
| 7,430,343 B2 * | 9/2008 | Hayes et al. ............ 382/305 |
| 2002/0087497 A1 | 7/2002 | Troianova et al. |
| 2004/0111672 A1 * | 6/2004 | Bowman et al. ............ 715/513 |
| 2006/0242261 A1 | 10/2006 | Piot et al. |
| 2007/0033221 A1 | 2/2007 | Copperman et al. |
| 2007/0157165 A1 | 7/2007 | Kim |
| 2008/0040364 A1 | 2/2008 | Li |
| 2009/0273604 A1 * | 11/2009 | Kim ............................. 345/522 |
| 2011/0087704 A1 | 4/2011 | Bishop et al. |
| 2011/0145657 A1 | 6/2011 | Bishop et al. |
| 2011/0153712 A1 * | 6/2011 | Whetsel ........................ 709/201 |

OTHER PUBLICATIONS

Information Disclosure Statement (IDS) Letter Regarding Common Patent Application(s), dated Jul. 18, 2012.
Information Disclosure Statement (IDS) Letter Regarding Common Patent Application(s), dated May 15, 2013.
Information Disclosure Statement (IDS) Letter Regarding Common Patent Application(s), dated Mar. 21, 2012.

* cited by examiner

*Primary Examiner* — Xiao Wu
*Assistant Examiner* — Mohammad H Akhavannik
(74) *Attorney, Agent, or Firm* — Krishnendu Gupta; Joseph D'Angelo

(57) ABSTRACT

A method of dynamically generating a graphic includes receiving, at a vector graphics engine loaded on a server system, graphic template input; receiving, at the vector graphics engine loaded on the server system, data template input; and generating, at the server system, code in a standard format representative of a vector graphic. The generating includes identifying a special tag associated with the vector graphics engine, converting code associated with this tag from a first format associated with the vector graphics engine to a second standardized format, and binding data content based on the received data template input to graphic content based on the received graphic template input.

20 Claims, 31 Drawing Sheets

DSG Source Example

```
<dsg:grid x="Xa", y="Ya", width="Wa", height="Ha", hspacing="%HSa", vspacing="%VSa", aspect="false">
  <Rectangle x="Xr", y="Yr", width="Wr", height="Hr"/>
  <Ellipse xc="Xe", yc="Ye", rx="RXe", ry="RYe"/>
</dsg:grid>
```

SVG Output Example - Horizontal

```
<g transform="scale(XSa, YSa) translate(Xa/XSa, Ya/YSa)">
  <g transform="translate(0,0)">
    <Rectangle x="Xr", y="Yr", width="Wr", height="Hr"/>
    <Ellipse xc="Xe", yc="Ye", rx="RXe", ry="RYe"/>
  </g>
  <g transform="translate(Wc+HSa,0)">
    <Rectangle x="Xr", y="Yr", width="Wr", height="Hr"/>
    <Ellipse xc="Xe", yc="Ye", rx="RXe", ry="RYe"/>
  </g>
  <g transform="translate(2*[Wc+HSa],0)">
    <Rectangle x="XR", y="Yr", width="Wr", height="Hr"/>
    <Ellipse xc="Xe", yc="Ye", rx="RXe", ry="RYe"/>
  </g>
  <g transform="translate(0,Hc+VSa)">
    <Rectangle x="Xr", y="Yr", width="Wr", height="Hr"/>
    <Ellipse xc="Xe", yc="Ye", rx="RXe", ry="RYe"/>
  </g>
  <g transform="translate(Wc+HSa,Hc+VSa)">
    <Rectangle x="Xr", y="Yr", width="Wr", height="Hr"/>
    <Ellipse xc="Xe", yc="Ye", rx="RXe", ry="RYe"/>
  </g>
  <g transform="translate(2*[Wc+HSa],Hc+VSa)">
    <Rectangle x="XR", y="Yr", width="Wr", height="Hr"/>
    <Ellipse xc="Xe", yc="Ye", rx="RXe", ry="RYe"/>
  </g>
</g>
```

Legend
a – Array
b – Boundary
c – Cell
r – Rectangle
e – Ellipse
nx – HorzRepeat Count
ny – Vert Repeat Count Boundary: (0, 0, Wb, Hb)

Cell: (0, 0, Wc, Hc)
Rect: (Xr, Yr, Wr, Hr)
Ellipse: (Xe, Ye, RXe, RYe)

Cell: (Wc+HSa, 0, Wc, Hc)
Rect: (Xr+[Wc+HSa], Yr, Wr, Hr)
Ellipse: (Xe+[Wc+HSa], Ye, RXe, RYe)

Cell: (2*[Wc+HSa], 0, Wc, Hc)
Rect: (Xr+2*[Wc+HSa], Yr, Wr, Hr)
Ellipse: (Xe+2*[Wc+HSa], Ye, RXe, RYe)

Cell: (0, Hc+VSa, Wc, Hc)
Rect: (Xr, Yr+[Hc+VSa], Wr, Hr)
Ellipse: (Xe, Ye+[Hc+VSa], RXe, RYe)

Cell: (Wc+HSa, Hc+VSa, Wc, Hc)
Rect: (Xr+[Wc+Sa], Yr+[Hc+VSa], Wr, Hr)
Ellipse: (Xe+[Wc+VSa], Ye+[Hc+VSa], RXe, RYe)

Cell: (2*[Wc+HSa], Hc+VSa, Wc, Hc)
Rect: (Xr+2*[Wc+HSa], Yr+2*[Hc+VSa], Wr, Hr)
Ellipse: (Xe+2*[Wc+HSa], Ye+2*[Hc+VSa], RXe, RYe)

Layout $Wc = Max(Xr+Wr, Xe+RXe)$
$Hc = Max(Yr+Hr, Ye+RYe)$ $Wb = nx * Wc + (nx-1) * HSa$
$Hb = ny * Hc + (ny-1) * VSa$ $HSa = \%HSa * Wc$
$VSa = \%VSa * Hc$ $XSa = ("Aspect"==false)\ ?\ Wa/Wb : Min(Wa/Wb, Ha/Hb)$
$YSa = ("Aspect"==false)\ ?\ Ha/Hb : Min(Wa/Wb, Ha/Hb)$

FIG. 5

*Example: Inputs*

Graphic Template Example:
```xml
<?xml version="1.0" encoding="UTF-8" standalone="no"?>
<svg xmlns="http://www.w3.org/2000/svg" xmlns:vge="http://www.adaptivity.org/2010/vge" version="1.1" baseProfile="full" width="1500px" height="1000px" viewBox="0 0 1500 1000">
    <vge:stack x="50" y="50" width="50" height="400" var="($var in $list)">
        <ellipse cx="50" cy="62" rx="30" ry="10" fill="red" />
        <text x="40" y="67" fill="white" style="font-family:Helvetica;font-size:12">$Count</text>
        <vge:formattedtext x="90" y="50" width="300" height="150" textstyle="fill:blue" rectstyle="fill:none;textpadding="0">
            $var
        </vge:formattedtext>
    </vge:stack>
</svg>
```

Example DataSource:
```xml
<?xml version="1.0" encoding="UTF-8"?>
<rowset>
    <list="List Name">
        <listitem>List Item #1 - Short Text</listitem>
        <listitem>List Item #2 - Short Text</listitem>
        <listitem>List Item #3 - Long Text: This data item is very long so that the example generated shows how the spacing is automatically adjusted to account for it.</listitem>
        <listitem>List Item #4 - Short Text</listitem>
        <listitem>List Item #5 - Short Text</listitem>
    </list>
</rowset>
```

*FIG. 8*

*Example Output*

Example SVG Output:
```
<svg xmlns="http://www.w3.org/2000/svg" xmlns:xlink="http://www.w3.org/1999/xlink" baseProfile="full" height="1000px" version="1.1" viewBox="0 0 1500 1000" width="1500px">
<g height="400" width="400" x="50" y="50")>
 <g transform="translate(50.0, 50)">
  <ellipse cx="50" cy="62" fill="red" rx="30" ry="10"/>
  <text fill="white" style="font-family:Helvetica;font-size:12" x="40" y="67">1</text>
  <g><rect height="18.0" style="fill:none;" textpadding="0" width="300" x="90" y="50"/><text height="150" style="fill:blue" textpadding="0" width="300" x="90.0" y="66.0"> List Item #1 - Short Text </text></g>
 </g>
 <g transform="translate(50.0, 75)">
  <ellipse cx="50" cy="62" fill="red" rx="30" ry="10"/>
  <text fill="white" style="font-family:Helvetica;font-size:12" x="40" y="67">2</text>
  <g><rect height="18.0" style="fill:none;" textpadding="0" width="300" x="90" y="50"/><text height="150" style="fill:blue" textpadding="0" width="300" x="90.0" y="66.0"> List Item #2 - Short Text </text></g>
 </g>
 <g transform="translate(50.0, 100)">
  <ellipse cx="50" cy="62" fill="red" rx="30" ry="10"/>
  <text fill="white" style="font-family:Helvetica;font-size:12" x="40" y="67">3</text>
  <g><rect height="56.0" style="fill:none;" textpadding="0" width="300" x="90" y="50"/><text height="150" style="fill:blue" textpadding="0" width="300" x="90.0" y="66.0"><tspan x="90.0" y="82.0">that the example generated shows how the spacing is </tspan><tspan x="90.0" y="98.0">automatically adjusted to account
 - Long Text: This data item is very long so </tspan><tspan></text></g>
for it.</g>
 <g transform="translate(50.0, 161)">
  <ellipse cx="50" cy="62" fill="red" rx="30" ry="10"/>
  <text fill="white" style="font-family:Helvetica;font-size:12" x="40" y="67">4</text>
  <g><rect height="18.0" style="fill:none;" textpadding="0" width="300" x="90" y="50"/><text height="150" style="fill:blue" textpadding="0" width="300" x="90.0" y="66.0"> List Item #4 - Short Text </text></g>
 </g>
 <g transform="translate(50.0, 186)">
  <ellipse cx="50" cy="62" fill="red" rx="30" ry="10"/>
  <text fill="white" style="font-family:Helvetica;font-size:12" x="40" y="67">5</text>
  <g><rect height="18.0" style="fill:none;" textpadding="0" width="300" x="90" y="50"/><text height="150" style="fill:blue" textpadding="0" width="300" x="90.0" y="66.0"> List Item #5 - Short Text </text></g>
 </g>
</g>
</svg>
```

Rendered Visualization:

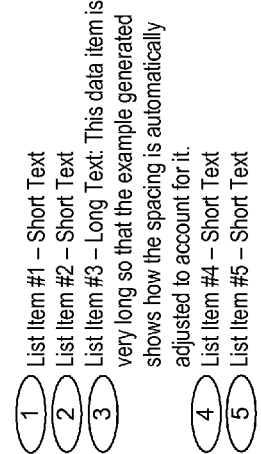

① List Item #1 – Short Text
② List Item #2 – Short Text
③ List Item #3 – Long Text: This data item is very long so that the example generated shows how the spacing is automatically adjusted to account for it.
④ List Item #4 – Short Text
⑤ List Item #5 – Short Text

FIG. 9

Dynamic Data Binding

| SQL Queries | Arrays | Conditions | Execute Queries | Final Operations | Velocity Expression | Parameters |

Define Execute Queries

[Add] [Edit] [Delete]            [Update Input Parameters]

| ID | Sequel Query ID | Connection ID | Output ID |
|---|---|---|---|
| dq1 | dq | designStudio - test | dq-out |

Preview Execute Query Output

[Execute]

| | BUSINESS_FUNCTION_ID | BUSINESS FUNCTION | DESCRIPTION | INDUSTRY_ID |
|---|---|---|---|---|
| 1 | | New Business Development | | 4 |
| 2 | | Customer Servicing & Sales | | 4 |
| 3 | | Customer Relationship Development | | 4 |
| 4 | | Branch Distribution Services | | 4 |
| 5 | | Business Portfolio Management | | 4 |
| 6 | | Fiscal Management | | 4 |
| 7 | | Retail Banking Product Delivery | | 4 |
| 8 | | Business and Resource Administration | | 2 |
| 38 | | Sales | | |

[Import] [Export] [Save] [Close] [Update Connections]

```xml
<?xml version="1.0" encoding="UTF-8"?>
<svg xmlns="http://www.w3.org/2000/svg" xmlns:dsg="http://www.adaptivity.org/2010/dsg"
xmlns:xlink="http://www.w3.org/1999/xlink" height="792" viewBox="0.0 0.0 1224.0 792.0" width="1224">

<dsg:DataBinding xmlns:dsg="http://www.adaptivity.org/2010/dsg'">
<dsg:SqlQueries>
<dsg:SqlQuery id="dq"><![CDATA[select * from business_functions]]></dsg:SqlQuery>
</dsg:SqlQueries>
<dsg:ColumnArrays/>
<dsg:Conditions/>
<dsg:ExecuteQueries>
<dsg:ExecuteQuery connectionId="designStudio - test" id="dq1" outputId="dq-out" sqlqueryId="dq">
<dsg:InputParameters/>
</dsg:ExecuteQuery>
</dsg:ExecuteQueries>
<dsg:HolderOperations>
<dsg:HolderOperation inputId="dq-out" operationType="list" order="1" outputId="dq1_out" param1=""
param2="" param3=""/>
</dsg:HolderOperations>
<dsg:CustomVelocityExpression><!--null--></dsg:CustomVelocityExpression>
<dsg:Parameters/>
</dsg:DataBinding>
<g id="Layer_0"><dsg:fxgrid borderstyle="stroke:#000000;stroke-width:1" height="140" maxheight="500"
rowcolors="$cccccc;stroke:#000000,#ffffff;stroke:#000000" showcols="true" var="($var in $dq1_out)"
width="300" x="40" y="60"><dsg:fxcolumn headerstyle="font-family:Tahoma;font-size:11;" name="ID"
style="fill:#ffffff;stroke:#000000" width="100">
<dsg:ftext rectstyle="fill:none;stroke:none" textpadding="0" textstyle="font-family:Tahoma;font-size:11;"
width="100" x="0" y="60">
var.getColumn(1)
</dsg:ftext>
</dsg:fxcolumn>
<dsg:fxcolumn headerstyle="font-family:Tahoma;font-size:11;" name="NAME"
style="fill:#ffffff;stroke:#000000" width="100">
<dsg:ftext rectstyle="fill:none;stroke:none" textpadding="0" textstyle="font-family:Tahoma;font-size:11;"
width="100" x="0" y="60">
$var.getColumn(2)
</dsg:ftext>
</dsg:fxcolumn>
</dsg:fxgrid>
</g>
</svg>
```

| boundingBox | 10;80;180;700 | | |
|---|---|---|---|
| contentHeight | 500 | | |
| contentWidth | 500 | | |
| edges | 500 | | |
| layoutType | HierarchicalL... | | |
| maxHeight | | AlternatingRadia | |
| name | | BusLayout | |
| scaleX | | CircularLayout | |
| scaleY | | | GridLayout |
| showArrow | | | HierarchicalLay |
| transformX | | | RadialTreeLayo |
| transformY | | | RandomLayout |
| uniqueIds | | | TopologicalMes |
| variable | $var in $p1 | | |

*FIG. 25*

| ID | Name |
|---|---|
| 1 | User Defined |
| 2 | Capital Markets |
| 3 | Manufacturing |
| 4 | Retail Banking |
| 5 | Education |
| 6 | Telco |
| 7 | Consumer Packaged Goods |
| 8 | Logistics |
| 9 | Law Enforcement |
| 10 | Government Social Services |
| 11 | Government Common Services |

Header

Footer

*FIG. 26*

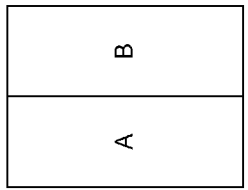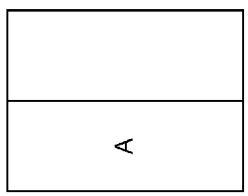
FIG. 27A

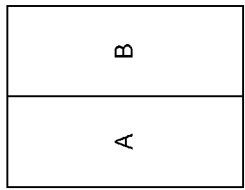
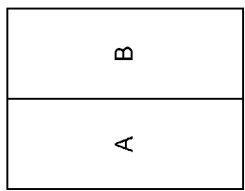
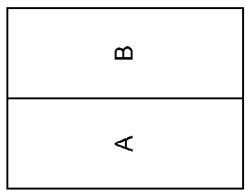
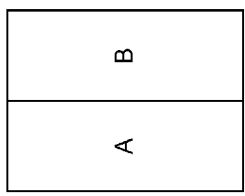
FIG. 27B

DYNAMIC SERVER GRAPHICS

CROSS-REFERENCE TO RELATED APPLICATION

The present application is a U.S. nonprovisional patent application of, and claims priority under 35 U.S.C. §119(e) to, U.S. provisional patent application Ser. No. 61/342,651, filed Apr. 16, 2010, which provisional patent application is hereby incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to graphics generation, such as, for example, techniques for dynamically serving vector graphics that include characteristics drawn from dynamic data.

The process of dynamically generating HTML pages has been common industry practice since 1997. Examples of this page server technology are Oracle™'s Java™ Server Page (JSP™) technology and Microsoft™'s Active Server Page (ASP™) technology. These technologies allow a programmer to write code that is processed by a server engine to control the generation of HTML and CSS. This code is generally referred to as server-side code, is embedded within traditional HTML and CSS page markup, may draw on external resources such as a database, and is in effect a web template that is executed upon request of a client browser. Each page server technology has its own programming constructs which amount to a proprietary standard that describe engine instructions; however, the resulting output is based on generating HTML and CSS standard compliant output as defined by the various World Wide Web Consortium (W3C) standard committees.

Although the generation of these web templates allows page authors to generate dynamic presentations of data with relative ease, these technologies are oriented toward the formatting of text pages with graphics presentation limited to referencing images, not the dynamic creation of graphics themselves.

There are many application programming interfaces (APIs) that support the creation of graphics programmatically. Oracle's Java2D™ and Microsoft's Graphic Device Interface (GDI™) are two examples. These technologies support the programmatic creation of vector graphics. However, these interfaces are very granular and difficult to use (e.g., they may require programmatic instructions such as draw a line from point x1,y1 to x2,y2). This limits their industry use as foundational components that are leveraged by various drawing tools; they are not frequently used directly to develop dynamic graphic generation solutions due to the time intensive nature of such efforts and the related expense.

Various abstractions have been developed to provide a more manageable interface for the development, storage, and presentation of vector graphics. Most of these technologies are rooted in eXtensible Markup Language (XML). Examples of such technology include the Web Hypertext Application Technology Working Group's (WHATWG) Scalar Vector Graphics (SVG) and the proposed W3C Vector Markup Language (VML). SVG is the vector graphic analog to what HTML is to web pages. SVG uses XML tags to give a high-level description of instructions that can be interpreted by a SVG Interpreter to render a vector graphic image via low-level APIs, such as Java2D or GDI. SVG based images are generally created via SVG-based drawing tools, much like how HTML pages are created via HTML editors. The user of such tools is usually unaware of the underlying data's representation in XML. While the use of standard XML programming techniques to programmatically manipulate the underlying data structures of a vector graphic described via XML (e.g., via SVG) is possible, it is also a time intensive and costly process to develop solutions with.

To facilitate the editing of HTML to introduce server-side code, there is a design paradigm that allows the implementer to transition between views of different visualizations. These views include visualizations of raw HTML tags with server-side code, a design view that allows manipulation of underlying HTML, and a preview of a generated HTML visualization. This design paradigm facilitates multiple perspectives of the pieces that render the final output result. In vector graphic development tools, visualization is limited to drawing tools and static output. Adding programmatic manipulation of underlying XML is a separate task that happens within a coding tool. An integrated approach to manipulating vector graphics, such as those used in HTML development paradigms, does not exist, nor do traditional approaches to the creation of vector graphics easily fit this development model.

Unlike HTML, which has complex presentation layout constructs such as Tables or Lists, XML vector languages are limited to basic primitives such as Rectangles, Ellipses, or Text descriptors. The absence of these layout constructs further compounds the difficulty of programmatically creating complex vector graphics.

Adobe's Flex™, Flash™, and Shockwave™ products do provide the means to programmatically manipulate vector graphics, but with a focus on vector animation. The mapping of data directly into vector graphic presentation can be accomplished, but with the use of proprietary low-level APIs and a scripting language. Similar to the XML vector languages, Adobe's proprietary approach is limited to basic drawing primitives with the addition of the integrated programming interface. The creation of the vector image itself is regulated to the use of drawing canvas such that each element must be drawn by hand or via low-level API calls, which is a time consuming process that requires a rare mix of graphical and programming talent, both of which can be prohibitively expensive for many implementations. These solutions do not supply complex compound primitives or high-level layout constructs needed to facilitate the rapid development of programmatic generation of vector graphics without having to use low-level API calls.

A need exists for improvement in dynamic graphic creation. This, and other needs, are addressed by one or more aspects of the present invention.

SUMMARY OF THE INVENTION

The present invention includes many aspects and features. Moreover, while many aspects and features relate to, and are described in, the context of dynamic vector graphic creation, the present invention is not limited to use only in this context, as will become apparent from the following summaries and detailed descriptions of aspects, features, and one or more embodiments of the present invention.

Accordingly, one aspect of the present invention relates to a method of rendering a dynamic graphic utilizing a vector graphics engine. The method includes receiving, at a vector graphics engine loaded on a computing device, a graphic template; receiving, at the vector graphics engine loaded on the computing device, a data template; binding, in a data binding process executed by a processor of the computing device, data identified via the data template to vector graphic content identified by the graphic template; and generating, by the processor of the computing device, vector graphic output that conforms to a particular format, the vector graphic output including the bound data identified via the data template in vector graphic form in accordance with the graphic template.

In a feature of this aspect, the particular format that the vector graphic output conforms to is the scalable vector graphic (SVG) standard.

In a feature of this aspect, the graphic template comprises a plurality of other graphic templates.

In a feature of this aspect, the graphic template comprises a plurality of other graphic templates associated together in an embedded hierarchy.

In a feature of this aspect, the method includes a step of parsing, by the vector graphics engine loaded on the computing device, source for one or more tags existing in a special namespace. In at least some implementations, the method includes a step of matching such one or more tags to one or more complex compound primitives programmatically enabled within the vector graphics engine loaded on the computing device.

In a feature of this aspect, the vector graphics engine loaded on the computing device is configured to convert code representative of high level constructs into the particular format. In at least some implementations, the high level constructs include an array construct, grid construct, list construct, and/or stack construct.

In a feature of this aspect, the vector graphics engine is configured to pass through markup standard to the particular format.

In a feature of this aspect, the computing device is connected to a network. In at least some implementations, the vector graphics engine loaded on the computing device is configured to process received data asynchronously. In at least some implementations, the vector graphics engine loaded on the computing device is configured to process received data synchronously.

Another aspect of the present invention relates to a method of dynamically generating a graphic. The method includes receiving, at a vector graphics engine loaded on a server system, graphic template input; receiving, at the vector graphics engine loaded on the server system, data template input; and generating, at the server system, code in a standard format representative of a vector graphic. The generating includes identifying a special tag associated with the vector graphics engine, converting code associated with this tag from a first format associated with the vector graphics engine to a second standardized format, and binding data content based on the received data template input to graphic content based on the received graphic template input.

Another aspect of the present invention relates to a method for a tool for facilitating creation of dynamic graphics. The method includes receiving, at a computing device, information regarding a connection to a data source input by a user via a user interface utilizing one or more input devices; receiving, at the computing device, a query input by a user via a user interface utilizing one or more input devices; receiving, at the computing device, an indication of an executable query input by a user via a user interface utilizing one or more input devices, the indication including reference to the inputted information regarding a connection to a data source and reference to the inputted query; receiving, at the computing device, an indication to place a graphic component on a canvas, the indication to place a graphic component on a canvas being input by a user via a user interface utilizing one or more input devices; receiving, at the computing device, an indication to associate data obtainable via the executable query with the graphic component, the indication to associate such data being input by a user via a user interface utilizing one or more input devices; displaying, utilizing an electronic display coupled to the computing device, a user interface comprising a preview of the graphic component including data obtained via the executable query; and generating, at the computing device, code configured to allow for the later display of the graphic component including data dynamically obtained from the data source.

Another aspect of the present invention relates to a computer readable medium having software loaded thereon comprising instructions for executing one or more methods disclosed herein.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIGS. 4-7 illustrate exemplary conversion of high-level layout constructs into scalable vector graphic format;

FIG. 8 illustrates exemplary input which may be fed into a vector graphic engine;

FIG. 9 illustrates exemplary output from the vector graphic engine based on the exemplary input illustrated in FIG. 8;

FIG. 17 illustrates how a user interface allows for a preview of execute query output for a particular query on a particular connection;

FIG. 19 illustrates a preview of generated code both prior to, and subsequent to, modification in accordance with a list operation;

FIG. 23 illustrates source code for a grid component;

FIGS. 24A-C illustrates the same data displayed in three different layouts;

FIG. 25 illustrates how a layout can be selected utilizing a layout type property;

FIG. 26 illustrates the use of header and footer images;

FIGS. 27A-B illustrate the use of paginated controls; and

DETAILED DESCRIPTION

Figure 1:
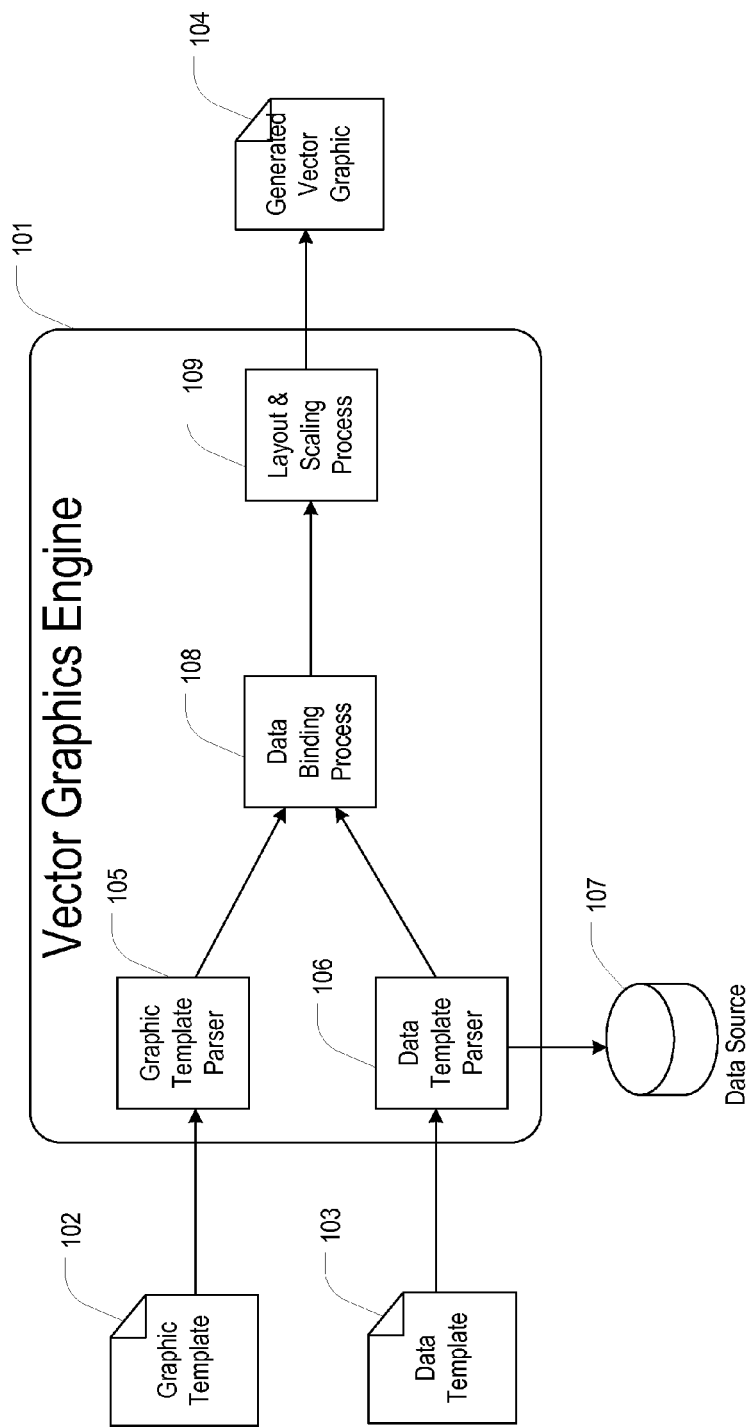
FIG. 1 is a high-level flow chart depicting an exemplary, preferred approach for inputs into a vector graphics engine, process steps within the vector graphics engine, and output result of the vector graphics engine.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers". Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

The use of relative terms, such as "substantially", "generally", "approximately", and the like, may be utilized herein to represent an inherent degree of uncertainty that may be attributed to a quantitative comparison, value, measurement, or other representation. These terms also may be utilized herein to represent the degree by which a quantitative representation may vary from a stated reference without resulting in a change in the basic function of the subject matter at issue.

Notably, any references herein to advantages, benefits, unexpected results, or operability are not intended as an affirmation of previous reduction to practice or testing. Likewise, unless stated otherwise, use of verbs in the past tense (or present perfect or preterit usage) is not intended to indicate or imply previous reduction to practice or testing.

Referring now to the drawings, one or more preferred embodiments of the present invention are next described.

The following description of one or more preferred embodiments is merely exemplary in nature and is in no way intended to limit the invention, its implementations, or uses.

One or more aspects of the present invention relate to a vector graphic engine that is able to consume graphic templates as guides to generate dynamically assembled vector graphics that incorporate complex compound primitives, high-level layout constructs, and data discovered/applied during the generation process via programmatic rules defined by an implementer.

In some preferred implementations, when a vector graphic engine request is invoked, a request object specifying a graphic template and a data template are passed into the vector graphic engine for processing according to embedded organizing controls and programmatic instructions. The vector graphic engine response is a well formed XML response, i.e. an XML response that conforms to a defined XML schema, compliant with the implemented vector graphic standard, such as, for example, the scalable vector graphic (SVG) standard.

FIG. 1 illustrates a vector graphics engine 101 in accordance with one or more preferred implementations. As illustrated, the vector graphics engine 101 is configured to take as input a graphic template 102 and a data template 103.

The vector graphics engine 101 includes a graphic template parser 105. When a graphic template 102 input is received at the vector graphics engine 101, it is fed into the graphic template parser 105 as input. The graphics template parser 105 consumes the input, processes any included file references, converts any complex compound primitives into one or more corresponding properly formatted standard XML vector graphic (e.g. SVG) counterparts, identifies various service-side code constructs to relate with run-time code objects, executes any pre-binding run-time code objects, and readies all binding variables for processing in a next stage of processing, namely a data binding process 108.

The vector graphics engine 101 further includes a data template parser 106. When a data template 103 input is received at the vector graphics engine 101, it is fed into the data template parser 106 as input. The data template parser 106 consumes the input; identifies various data sources, queries, and transformations from the content; reads any necessary data from specified data sources 107; and readies retrieved data for processing in the next stage of processing, namely the data binding process 108.

The data binding process 108 combines execute service-side code instructions to bind various elements of data to the vector graphic XML (e.g. SVG) content of the graphic template 102 with the data identified from the data template 103. This data bind process 108 produces an interim result that is fed into a layout and scaling process 109, which executes instructions as defined by the high-level layout constructs, including associated scaling, and executes any post-binding run-time code objects. The resulting output is a generated vector graphic 104 output that conforms to the preferred XML vector graphic specification (e.g. SVG).

Figure 2:
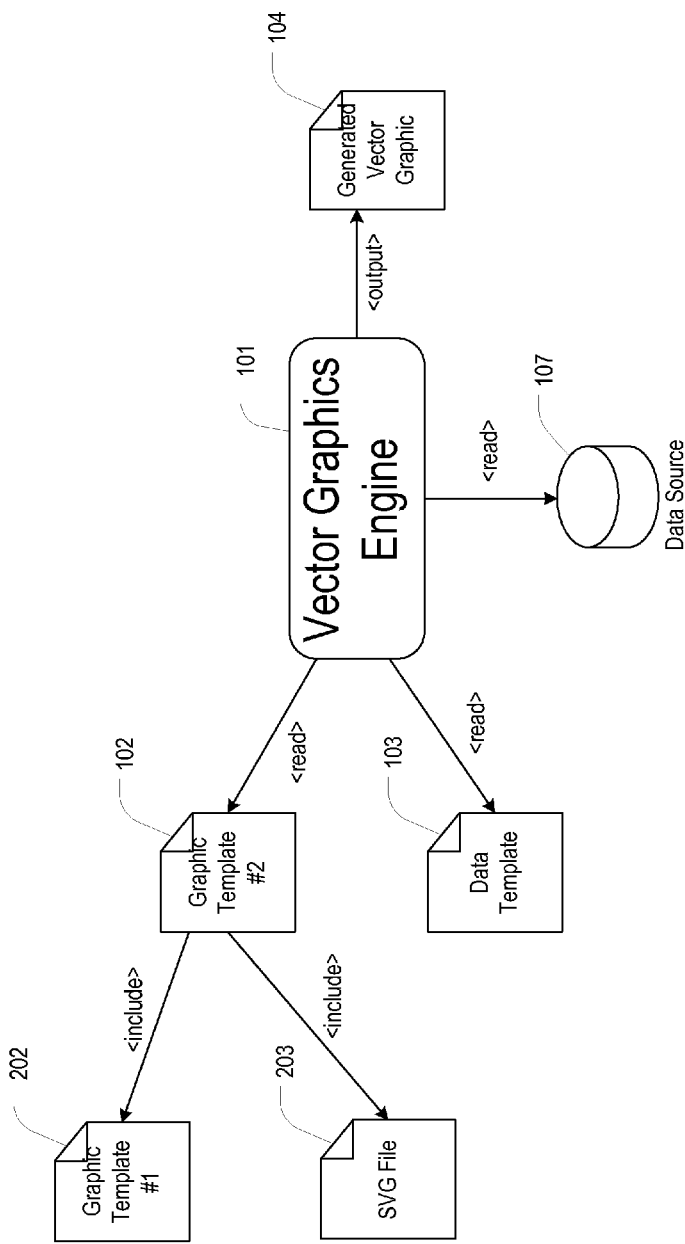
FIG. 2 illustrates a graphic template's ability to include external files including other graphic templates and standard vector graphic XML (e.g. SVG)

As depicted in FIG. 2, a graphic template 102 may include another graphic template 201 or other XML vector graphic 202. A graphic template can thus be characterized as being embeddable within another graphic template. A single graphic template might be reused in a plurality of other graphic templates, thus graphic templates can be characterized as being reusable. Accordingly, the use of graphic templates allows for the creation of reusable and embeddable hierarchies. A graphic template, or image, included within a graphic template may be included with or without a scale transformation depending on the implementer's requirements.

Figure 3:
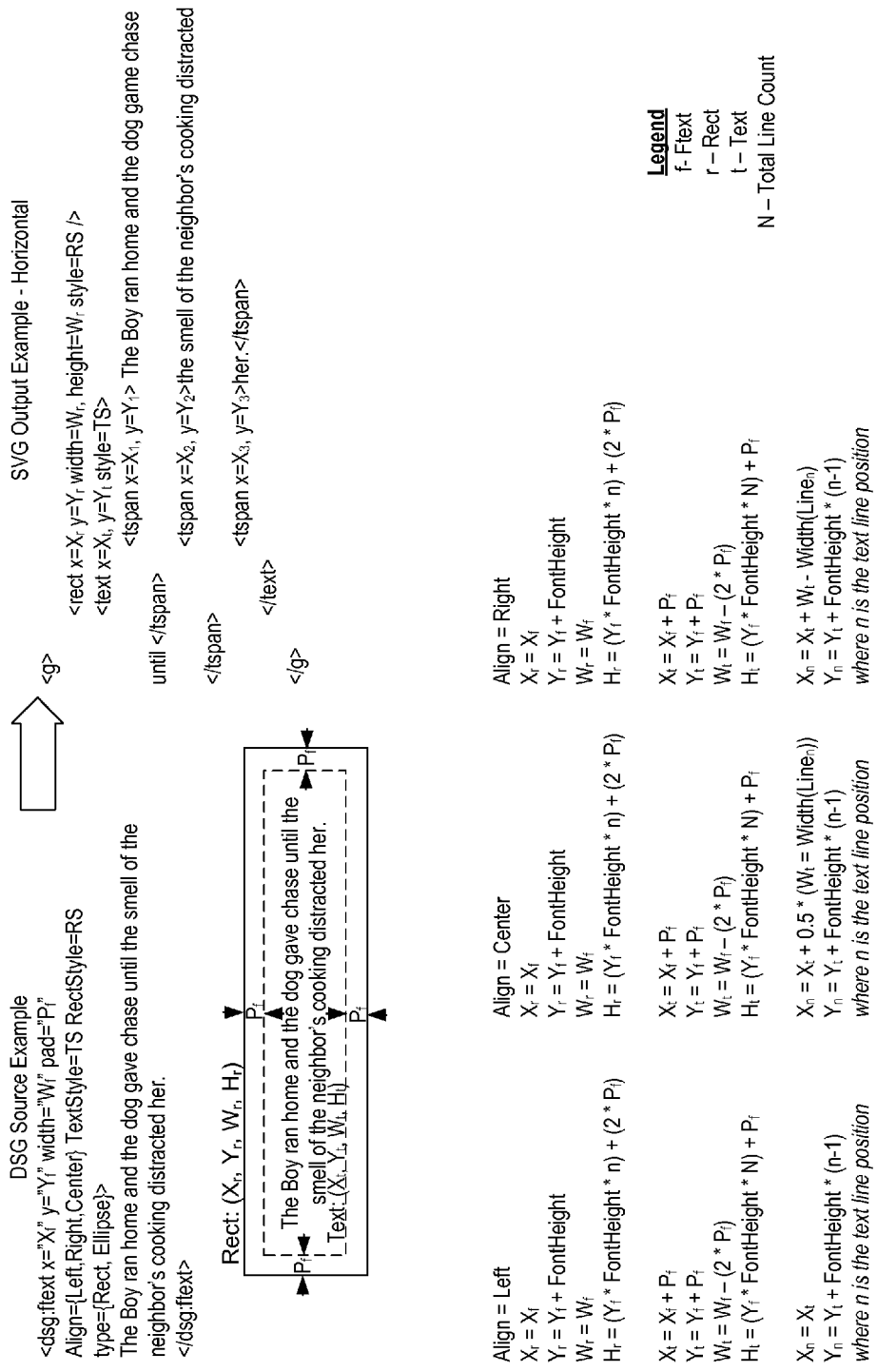
FIG. 3 illustrates exemplary conversion of a complex compound primitive into scalable vector graphic format.
Figure 4:
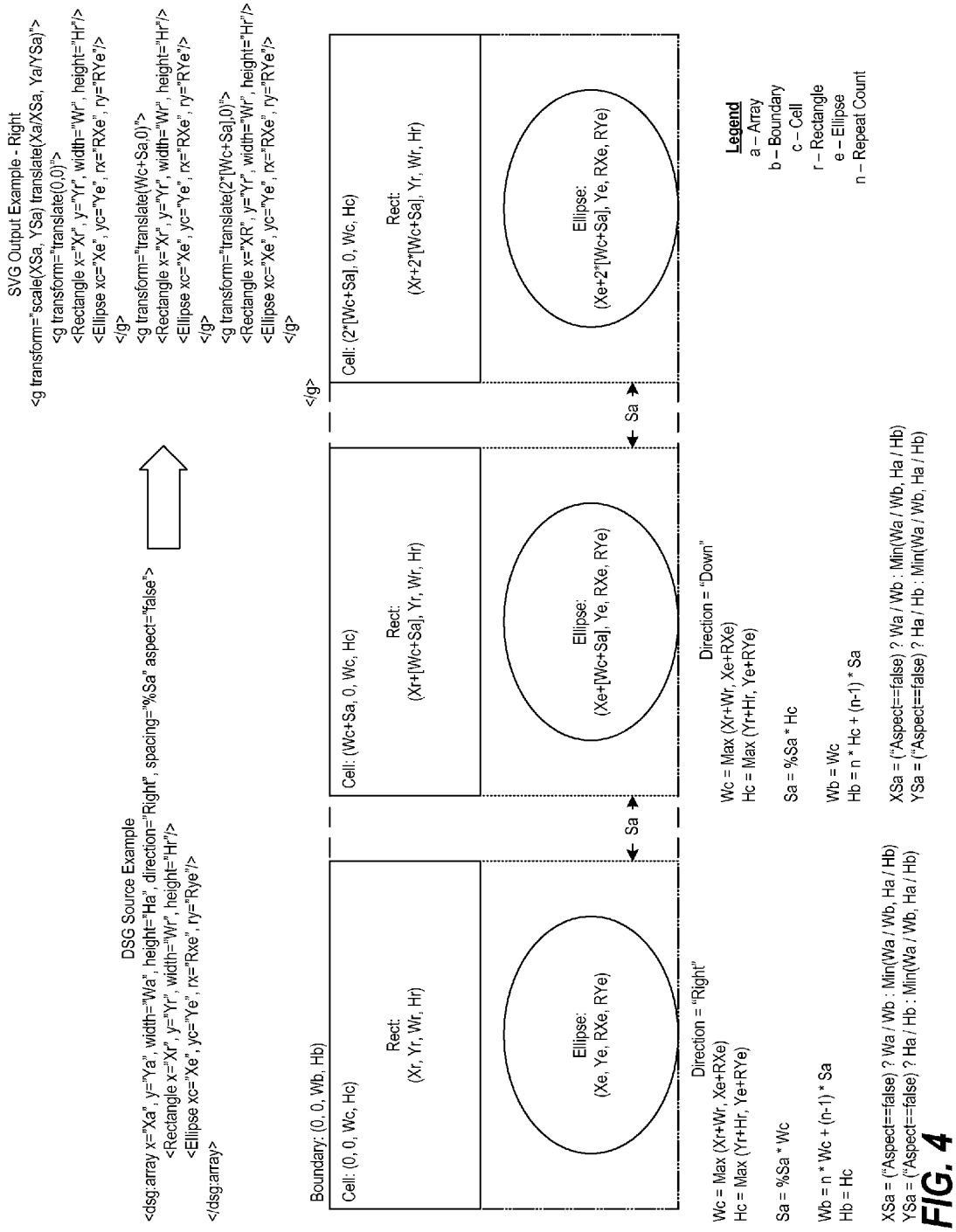
Figure 6:
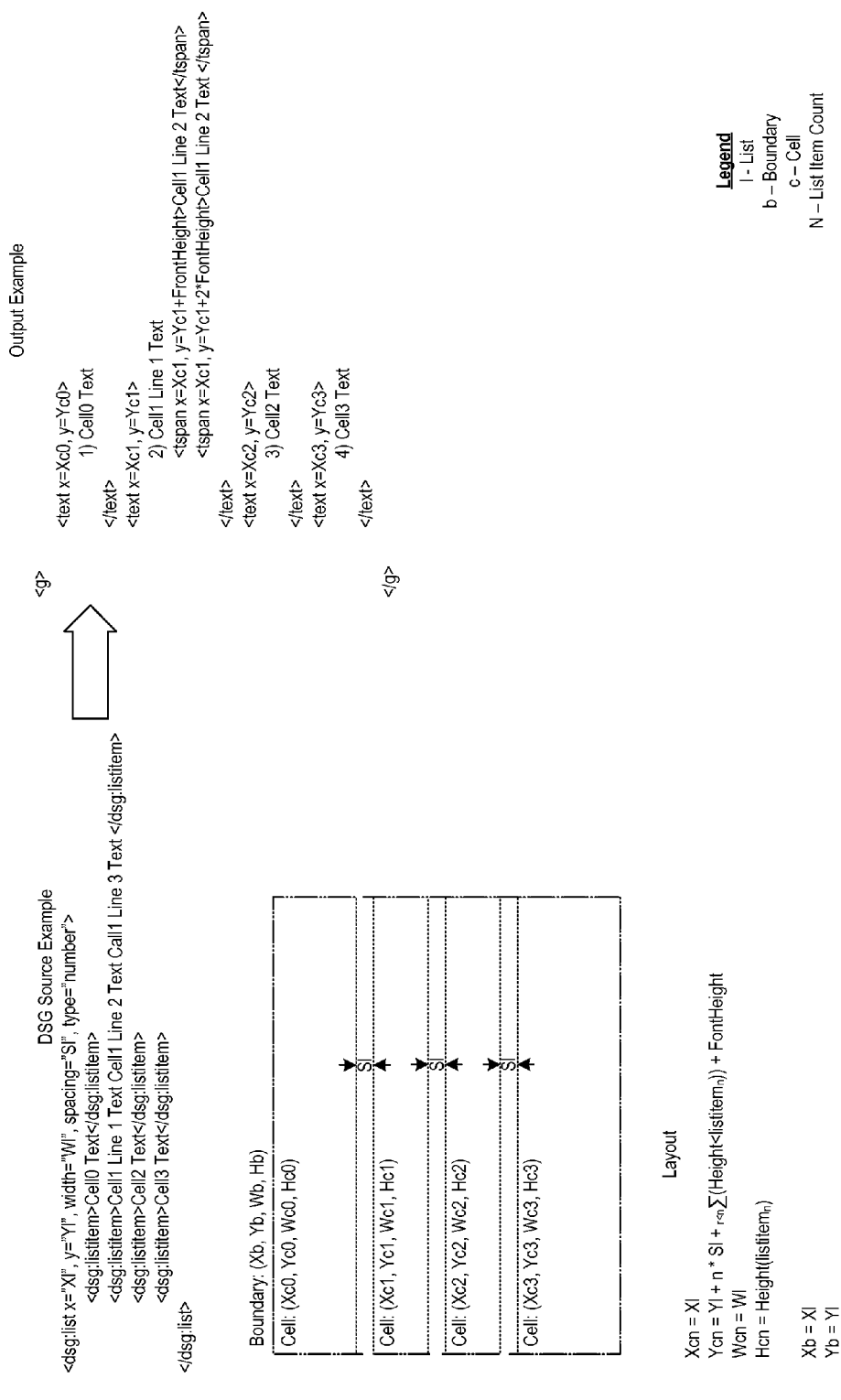
Figure 7:
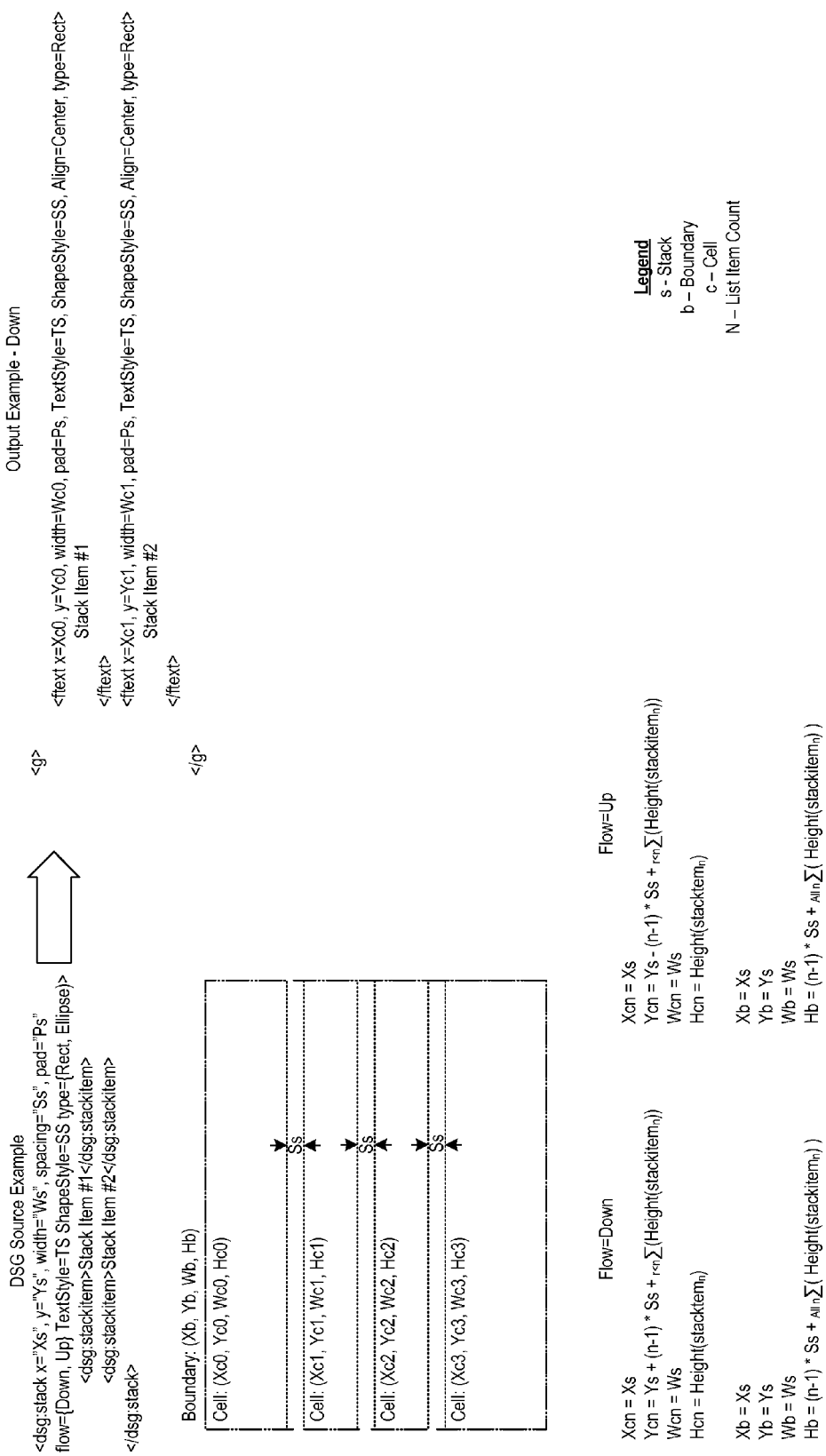

As noted above, during the graphic template parser 105 execution, conversion of complex compound primitives into properly formatted standard XML vector graphic tags (e.g. SVG) takes place. FIG. 3 depicts an example of conversion of a formatted text compound primitive into standard SVG objects.

FIG. 3 illustrates exemplary dynamic server graphic (DSG) source utilizing a formatted text compound primitive. When this source is parsed by the graphic template parser 105, because the <dsg:ftext> tag (or <vge:formattedtext>, for vector graphic engine (VGE) in at least some implementations, etc.) is not a standard SVG tag and exists in a special namespace, the parser looks for a matching complex compound primitive that has been programmatically enabled within the vector graphic engine 101.

This source is converted into SVG output, as illustrated, although in at least some other implementations the source may be converted into other output. The SVG output preferably uses only standard SVG tags, with all server-side tags preferably being, already having been, or later being, converted and removed from the output. This allows for sophisticated output formatting through the use of compact custom tags that expand to the appropriate standard SVG tags.

FIG. 3 also depicts a visualization of the resulting output, as well as calculations needed to determine the output.

Notably, this formatted text example is merely exemplary in nature, and is representative of one of many possible complex compound primitives. Each complex compound primitive may be implemented via a code behind class in the vector graphics engine 101 and support inheritance such that additional layouts can be created and/or extended as needed.

Further, as noted above, during the layout and scaling process 109 execution, the conversion of high-level layout constructs into properly formatted standard XML vector graphic tags (e.g. SVG) takes place. FIGS. 4, 5, 6, and 7 depict, respectively, the conversion of array, grid, list, and stack constructs into standard SVG objects. In the illustrated implementations, the array and grid constructs include evenly distributed same size cells, while the stack construct includes evenly distributed variable size cells.

Each figure includes exemplary DSG source utilizing, respectively, an array, grid, list, or stack construct. In each case, the source is similarly parsed and associated with a matching high-level layout construct as described above with respect to the conversion of a compound primitive into standard SVG objects.

Such source is converted into SVG output, as illustrated. The SVG output preferably uses only standard SVG tags, and the inner coordinate system of the cells preferably is, has been, or will be scaled and translated to map into the outer coordinate system. Preferably, all server-side tags are, have been, or will be converted and removed from the output. This allows for sophisticated output formatting through the use of compact custom tags that expand to the appropriate standard SVG tags.

FIGS. 4-7 also depicts a visualization of the resulting output, as well as the calculations needed to determine the output.

As with the formatted text example, the array, grid, list, and stack examples are merely exemplary in nature, and are representative of but a few of many possible high-level layout constructs. Each layout construct, or control, may be implemented via a code behind class in the vector graphics engine 101 and support inheritance such that additional layouts can be created and/or extended as needed.

FIG. 8 illustrates sample inputs that includes an exemplary graphical template and data from an exemplary data source.

The exemplary graphical template contains a stack layout construct and a formatted text complex compound primitive along with data binding variables (e.g., "$var" and "$list"). The data from the exemplary data source contains a list of items to be used during the data binding process 106 described above.

FIG. 9 depicts exemplary output derived from the inputs of FIG. 8. The output preferably includes SVG output and a rendered visualization.

As illustrated, the SVG output is fully expanded with the integrated content shown embedded within the SVG content. Further, the stack and formatted text objects have been converted to the appropriate SVG primitives and scaled appropriately to fit within the bounding constraints defined in the stack definition. The rendered visualization shows how the stack dynamically adjusted itself to fit the varying length of the text strings without an implementer needing to take any special actions.

Notably, in preferred implementations, the length of server-side code required to be written by an implementer is significantly smaller than the expanded SVG version. In at least some preferred implementations, this dramatically reduces the number of lines of source materials that need to be maintained, and may provide significant cost savings. Any changes to the stylization of one stack cell could affect the entire rendering, thus allowing stylistic changes to be implemented quickly. Preferably, the entire rendering process takes place without the implementer having to write any low-level API drawing methods (e.g. Window's GDI+ or Java 2D).

Preferably, the vector graphic engine 101 only operates on tags it has been programmatically enabled to process, therefore any standard markup in the graphical template 702 is automatically passed through; for SVG, this includes all standard tags including primitives, CSSs, standard includes, and client-side scripting. The native advanced capabilities of SVG to support CSSs, client-side scripting, etc. are preferably left to the sole purview of the implementer, although in at least some preferred implementations they may not be. In at least some preferred implementations, the vector graphic engine 101 is extendable to include concepts of caching, state, and smart navigation such as may be found on various application servers (e.g. ASP and JSP).

The vector graphic engine 101 can have a physical instantiation as a machine connected to a network. The transport technology is not specific to systems and processes described herein, and would, for example, support simple connection based protocols, such as IBM's Systems Network Architecture (SNA) or TCP/IP socket protocol. Data sent to, or received from, the vector graphics engine can be processed asynchronously, through message queuing, such as via Java Message Service (JMS), or asynchronous Remote Procedure Calls (RPC). By inclusion of the graphical template and data source, the system would run without manual intervention.

These basic capabilities will allow the technology to render dynamic images, which reflect data values set at run-time, while enabling a configuration interface that facilitates rapid development by a developer having a graphically inclined skill set, without the need for a seasoned programmer.

In one or more preferred implementations, a vector graphic engine is configured to generate output in .svg, .pdf, .jpeg, and/or .png format.

Figure 10:
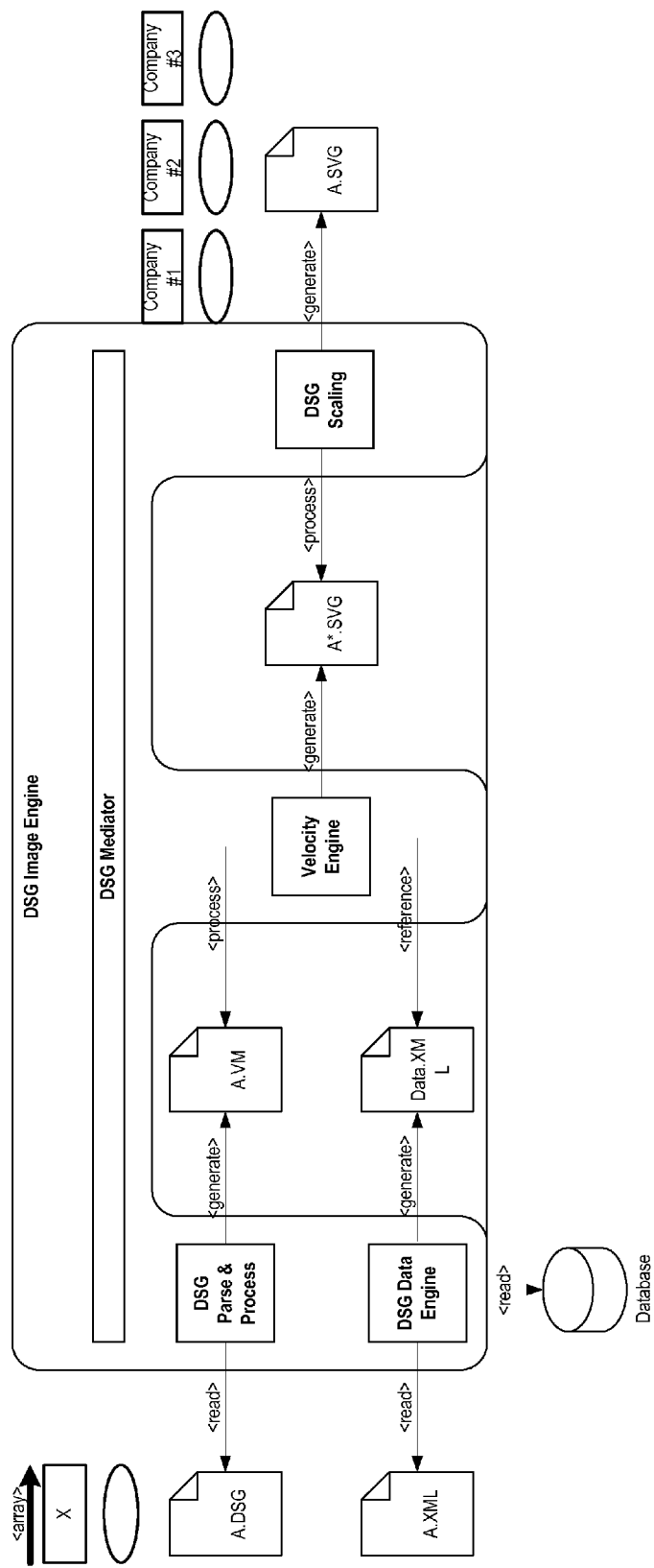
FIG. 10 illustrates an image engine representing an exemplary vector graphic engine.

FIG. 10 illustrates an image engine representing another exemplary vector graphic engine. The image engine includes a parsing and processing module, which is configured to take as an input a graphic template in the form of a .dsg component, which may comprise source, e.g. source contained in a .dsg file. The parsing and processing module reads the input .dsg component and generates a .vm component.

The image engine further includes a data engine module, which is configured to take as input a data template in the form of an .xml component. The data engine module is further configured to read a database. Based on the input .xml component, and data from the database, the data engine module generates a .xml data component.

The imagine engine still further includes a velocity engine, which is responsible for data binding processing. The velocity engine processes the .vm component generated by the parsing and processing module, and, referencing the .xml data component generated by the data engine module, generates an unscaled .svg component. The image engine still yet further includes a scaling module which processes this .svg component and generates a final .svg component.

Figure 11:
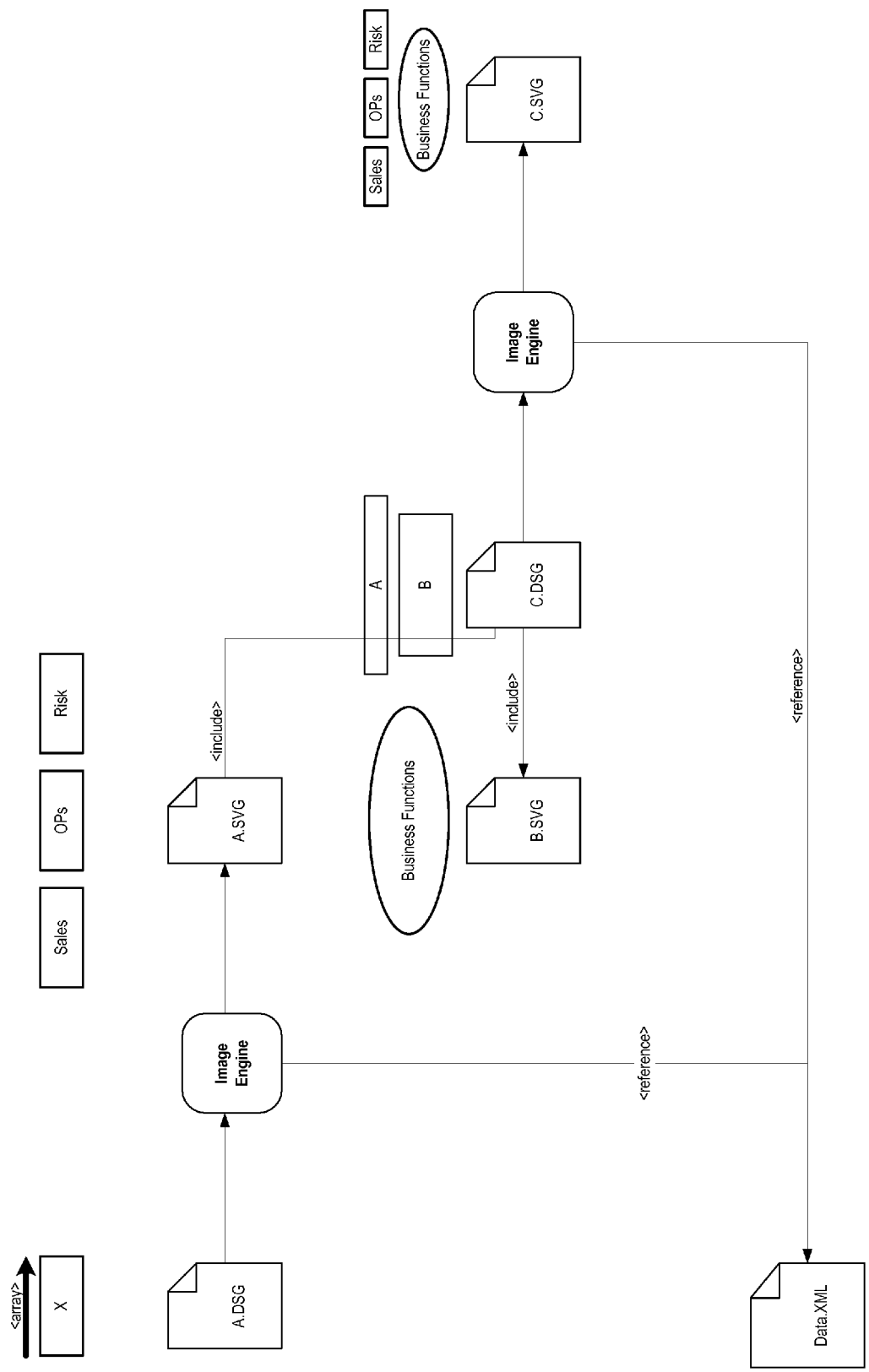
FIG. 11 is a flowchart illustrating the use of the image engine of FIG. 10 to create a graphic.

FIG. 11 is a flowchart illustrating the use of such image engine to create a graphic comprising three rectangles with text inside suspended over an ellipse having text inside. As illustrated in FIG. 11, a first dynamic server graphic component, or .dsg component, representing an array is processed by an image engine which references an extensible markup language data component, or .xml component, to generate a first scalable vector graphic component, or .svg component, which describes an array of rectangles filled with text, as illustrated.

Another .dsg component includes both the generated first .svg component and another .svg component which describes an ellipse filled with text. The .dsg component describes the relationship between the content described by each .svg component, specifically, that the content described by the first .svg component is to be located atop the content described by the second .svg component, as illustrated.

This second .dsg component is processed by an image engine which references an .xml component to generate a final .svg component, which describes three rectangles filled with text atop an ellipse filled with text, i.e. contains scalable vector graphic instructions for the creation of such an image.

Figure 12:
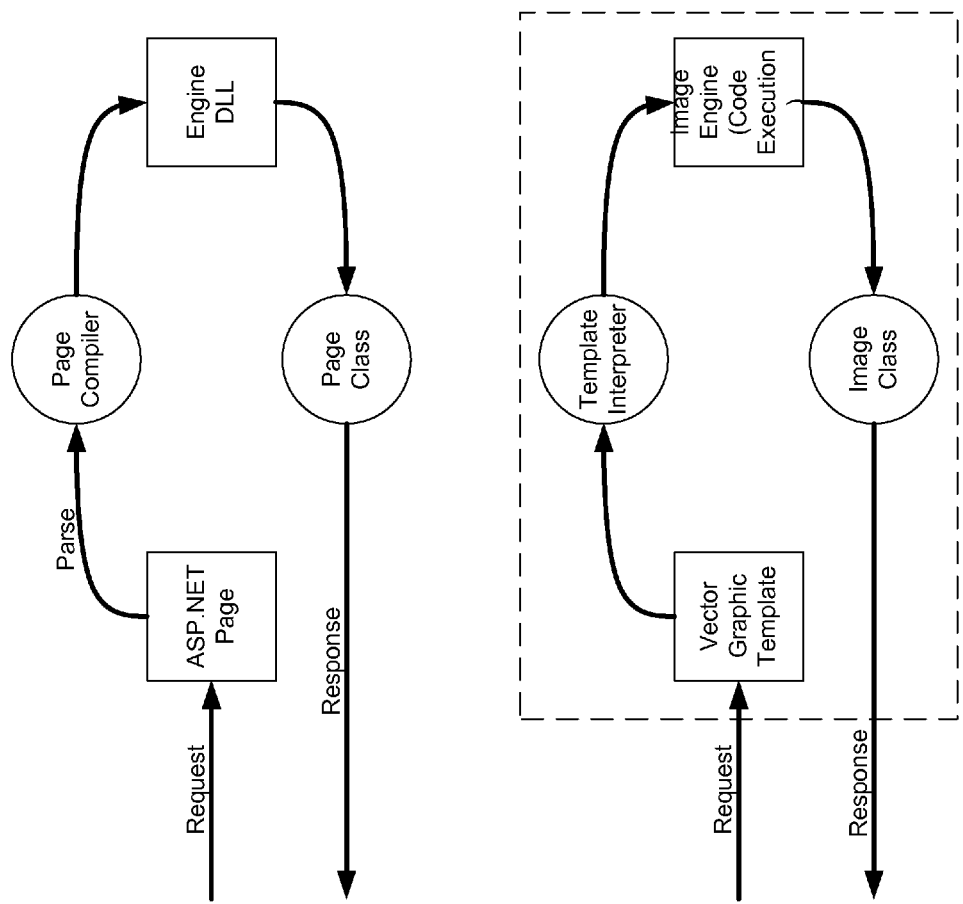
FIG. 12 illustrates how the image engine of FIG. 10 might be utilized in the context of a request associated with a vector graphic template.

FIG. 12 illustrates how such an image engine might be utilized in the context of a request associated with a vector graphic template. This process is similar to the process of parsing a request at a page compiler for processing by an engine DLL, as illustrated in FIG. 12.

In one or more preferred implementations, graphic templates provide a number of useful functions, such as, for example, the ability to organize traditional XML vector markup, to support late binding of code objects identified by custom XML tags, to incorporate high-level layout constructs to be converted into complex graphical representations made up of standard XML primitives, to organize server-side programmatic instructions to the vector graphic engine, and to designate appropriate data bindings from dynamically acquired data sources to XML graphic primitives (e.g. rectangle, ellipse, text, etc.). A graphic template can be characterized as a holistic and abstract guide that defines parameters and behaviors for how the graphics to be rendered, and also supplies programmatic instructions to the vector graphic engine (as illustrated in FIG. 3 hereinbelow).

Since a graphic template incorporates high-level layout constructs, in at least some preferred implementations, much of the low-level API implementation steps required in a traditional approach are eliminated. Exemplary high-level layout constructs include group layout controls, such as arrays, grids, and stacks, as well as complex compound primitives, such as text with primitive boundaries (e.g. text encapsulated by a rectangle), text lists, and complex formatted text (e.g. a word wrapped paragraph). Some exemplary behaviors of these high-level layout constructs have been described herein. Each high-level layout construct may provide complex, yet standardized behavior. For example, an array construct group can replicates a group of other graphic primitives in ordered evenly spaced cells, similar to how an HTML table is made up of cells with nested HTML primitives. However, the detailed behaviors of the high-level layout constructs in a graphic context are very different than traditional HTML layout concerns. For example, it is very typical for graphical objects to overlap for specific visual effects, whereas this is generally undesirable behavior for HTML pages. The high-level layout constructs have the added benefit of abstracting away the lower-level calls required to manipulate the underlying XML or the granular drawing APIs.

The vector graphic engine is preferably extensible, such that additional high-level layout constructs can be created as needed, and therefore it is preferably possible to define additional graphic behaviors and their implementations as needed. FIGS. 3-7 illustrate a variety of possible implementations—each is a unique extension of the vector graphic engine. The possibilities are limited only to the ability of the implementer to mathematically model the extensions.

Preferably, a vector graphic engine is able to adjust complicated scale factors as needed to adjust for layouts, eliminating concerns of complicated math on behalf of an implementer. High-level layout constructs may contain multiple primitives that are laid out in a repeated pattern (e.g., see the array construct illustrated in FIG. 4). To fit the outer layout constraints imposed on the layout construct, the inner content's size must be scaled to fit within the available space. This reduces complexity in graphic templates by enabling an implementer to work in multiple scales simultaneously without concern for manual scale conversion as object size and placement are relative to other objects in the same bounded area.

The use of these high-level layout constructs allows for the creation, and use, of tools which allow a user to create and edit graphic templates with various views to simplify the programming task. These tools preferably include a visualization of raw XML graphic tags (e.g. SVG) with server-side code, a design view that allows manipulation of the underlying XML graphic tags, and a preview of the generated graphic visualization. In a preferred implementation, one of these tools generally resembles IBM ILOG JViews software, and/or utilizes one or more ILOG libraries.

Figure 13:
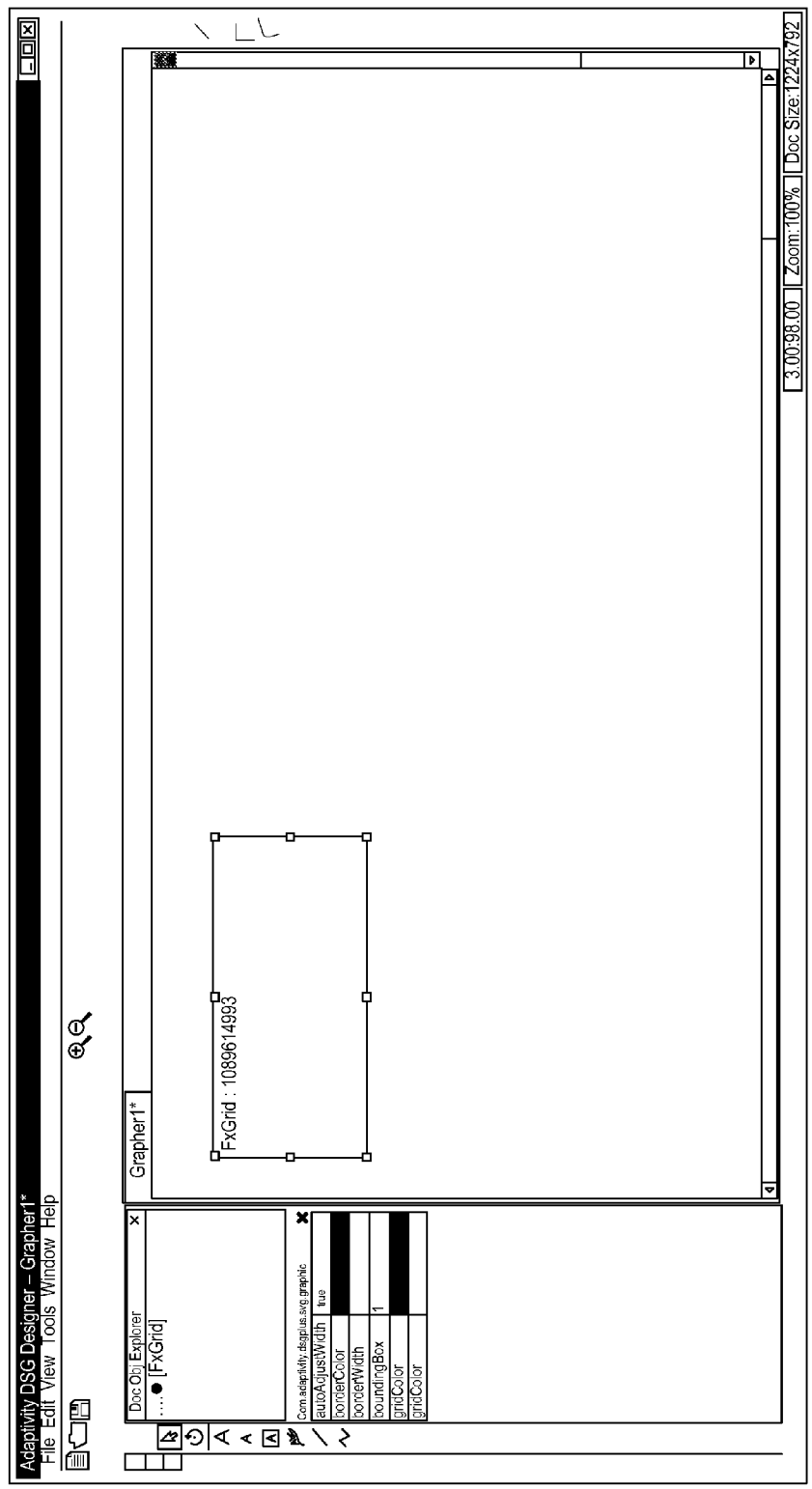
FIG. 13 illustrates an exemplary editor configured to allow for the easy creation of dynamic graphics and code therefor.

FIG. 13 illustrates an exemplary DSG editor configured to allow for the easy creation of dynamic graphics and code therefor. FIG. 13 illustrates a user interface of the editor utilized for placement of a FxGrid DSG component. The interface includes a panel displaying, and allowing editing of, a plurality of properties of the component, as illustrated.

Figure 14:
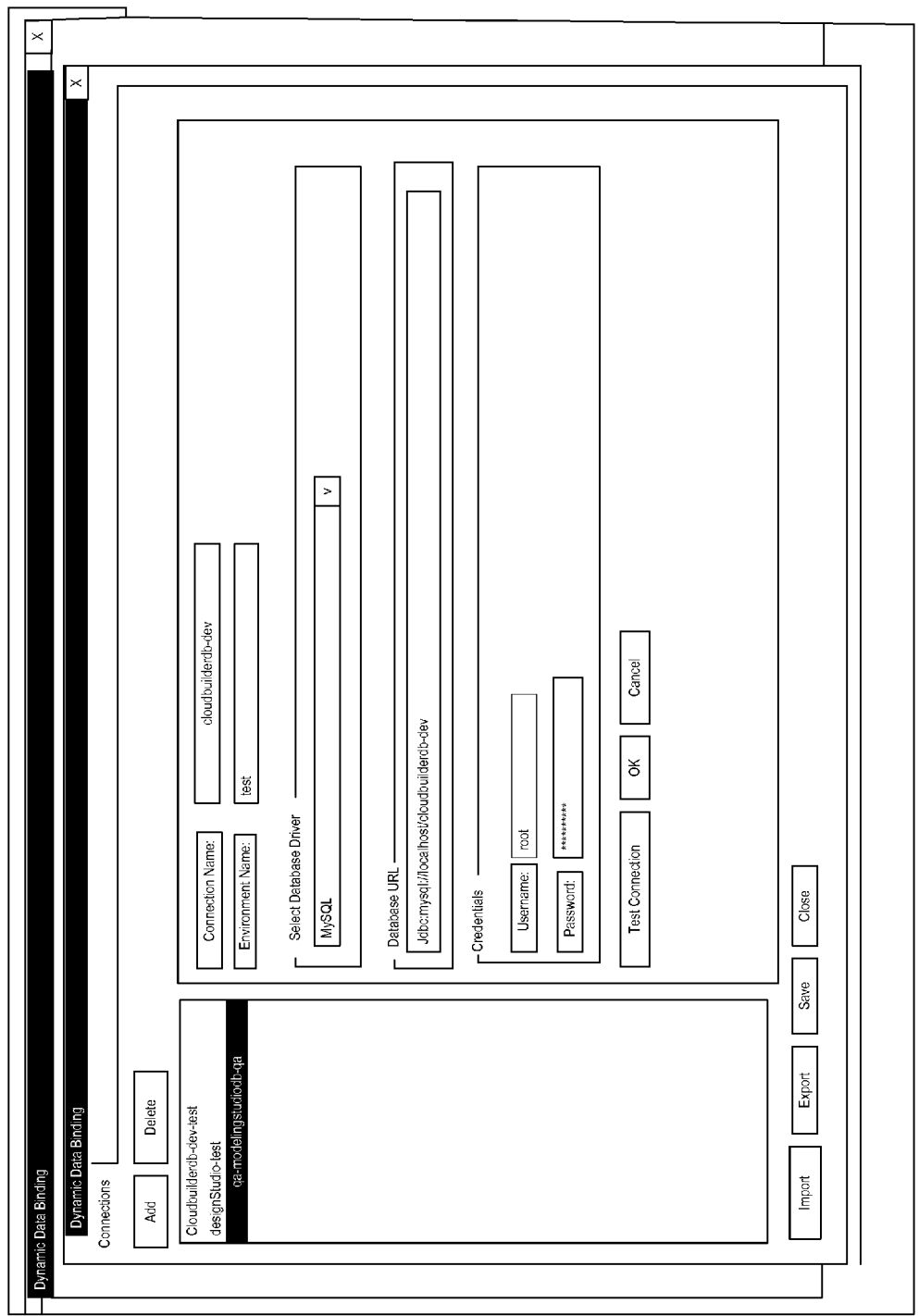
FIG. 14 illustrates a user interface that allows a user to define connections by selecting a database driver, a database location, or URL, and provide authentication credentials for the database.

The exemplary editor of FIG. 13 allows for the use of data from various data sources, such as, for example, MySQL, MSSQL, Data Access Layer POJO objects (e.g. to provide data access without providing direct access to obviate security issues), web services, or object databases. FIG. 14 illustrates a user interface that allows a user to define connections by selecting a database driver, a database location, or URL, and provide authentication credentials for the database. Each connection can be named for easy reference thereafter, and can be defined for use in an environment, for example a connection might be associated with use in a quality assurance environment.

Figure 15:
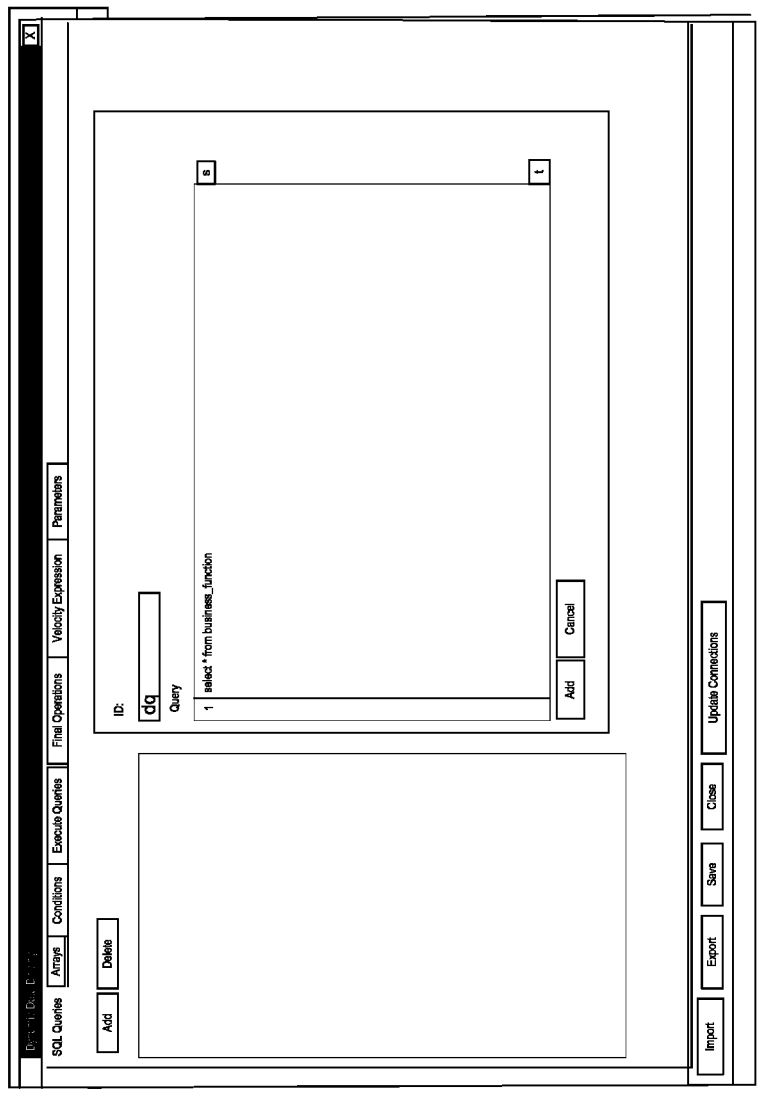
FIG. 15 illustrates a user interface of the editor which can be utilized to define a query and assign a query ID thereto.

The exemplary editor of FIG. 13 also allows a user to define queries. FIG. 15 illustrates a user interface of the editor which can be utilized to define a query and assign a query ID thereto. Multiple queries can be added via this interface, each including their own query ID for easy reference thereto. In an exemplary use scenario illustrated in FIG. 15, a user utilizes this interface to create a query and assign it a "dq" query ID.

Figure 16:
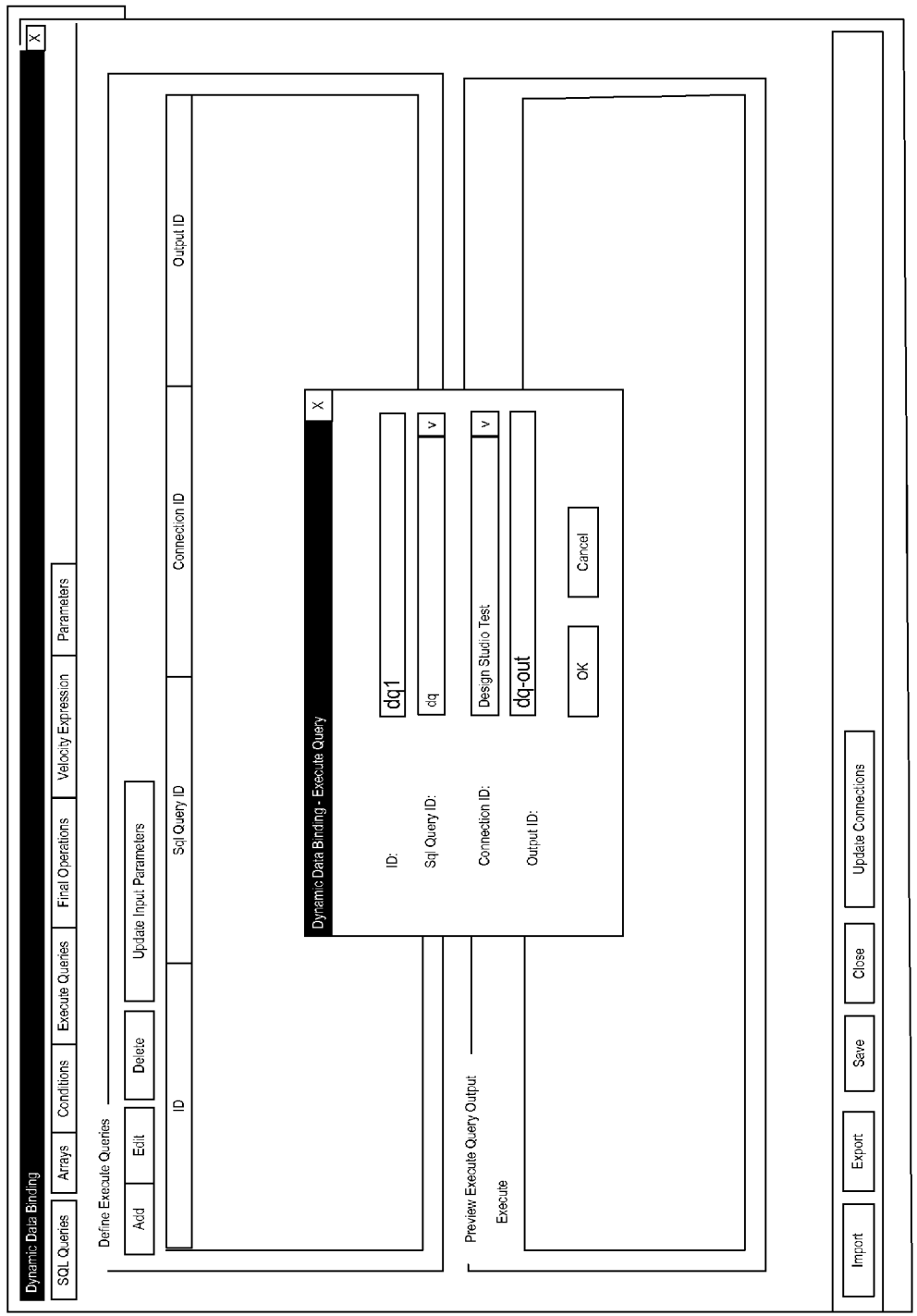
FIG. 16 illustrates a user interface of the exemplary editor which can be utilized to identify a query ID and a connection ID.

Following definition of a connection and a query, a query can be executed on a connection to generate query output. FIG. 16 illustrates a user interface of the exemplary editor which can be utilized to identify a query ID and a connection ID. A query execution ID and query execution output ID can then be provided by a user in association with the identified query ID and connection ID. FIG. 17 illustrates how a user interface allows for a preview of execute query output for a particular query on a particular connection. Returning to the exemplary use scenario, a user can utilize this interface to identify the previously defined "dq" query, and a previously defined "designStudio-test" connection, assign this combination a "dq1" ID, and assign the output to a "dq-out" output ID.

In preferred implementations, a user interface for data binding allows not just for the definition of database connections and queries, but additionally allows for the use of filters, conditions, and expressions.

Figure 18:
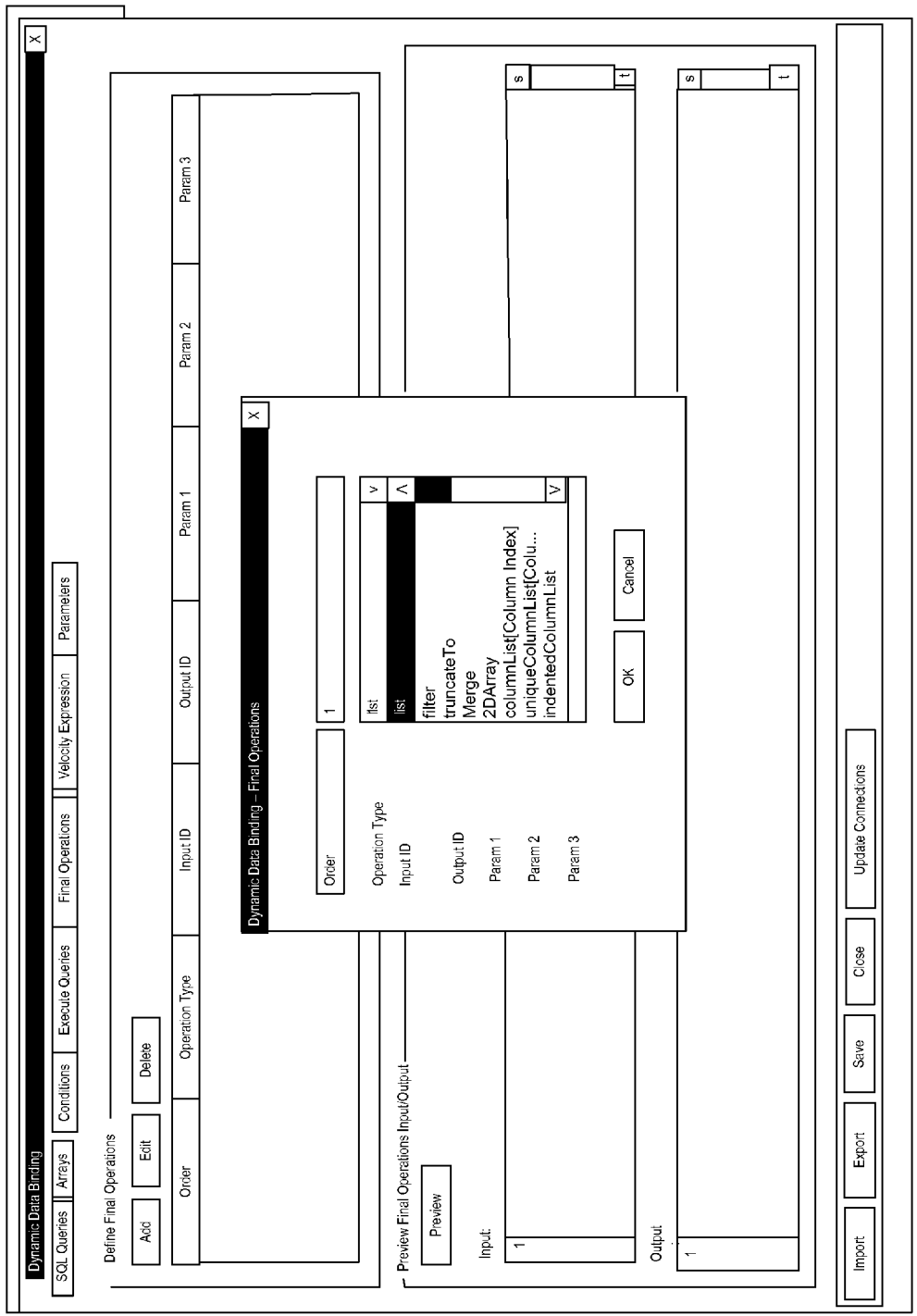
FIG. 18 illustrates a user interface that allows a user to select an operation, and identify operation input and output IDs.

Additionally, predefined, or user configurable, operations can be performed on execute query output. FIG. 18 illustrates a user interface that allows a user to select an operation, and identify operation input and output IDs. For example, a query execution output ID can be utilized as an operation input ID, and an operation output ID can be identified by a user. Preferably, multiple operations can be identified and performed in a sequence indicated by a user.

Returning to the exemplary use scenario, a user selects an operation type from a drop down menu (in this case a "list" operation), identifies the "dq-out" ID as an input ID for the operation, and identifies "dq1_out" as an output ID for the operation. Optionally, the user might identify one or more parameters, although in this exemplary use scenario the user does not do so. In one or more preferred implementations, parameters can be bound to variables and can be used in generating dynamic graphics based on the values of such variables. For example, in some preferred implementations, the value of a variable might be utilized to select a color for a cell or column of a FxGrid component.

Figure 19:
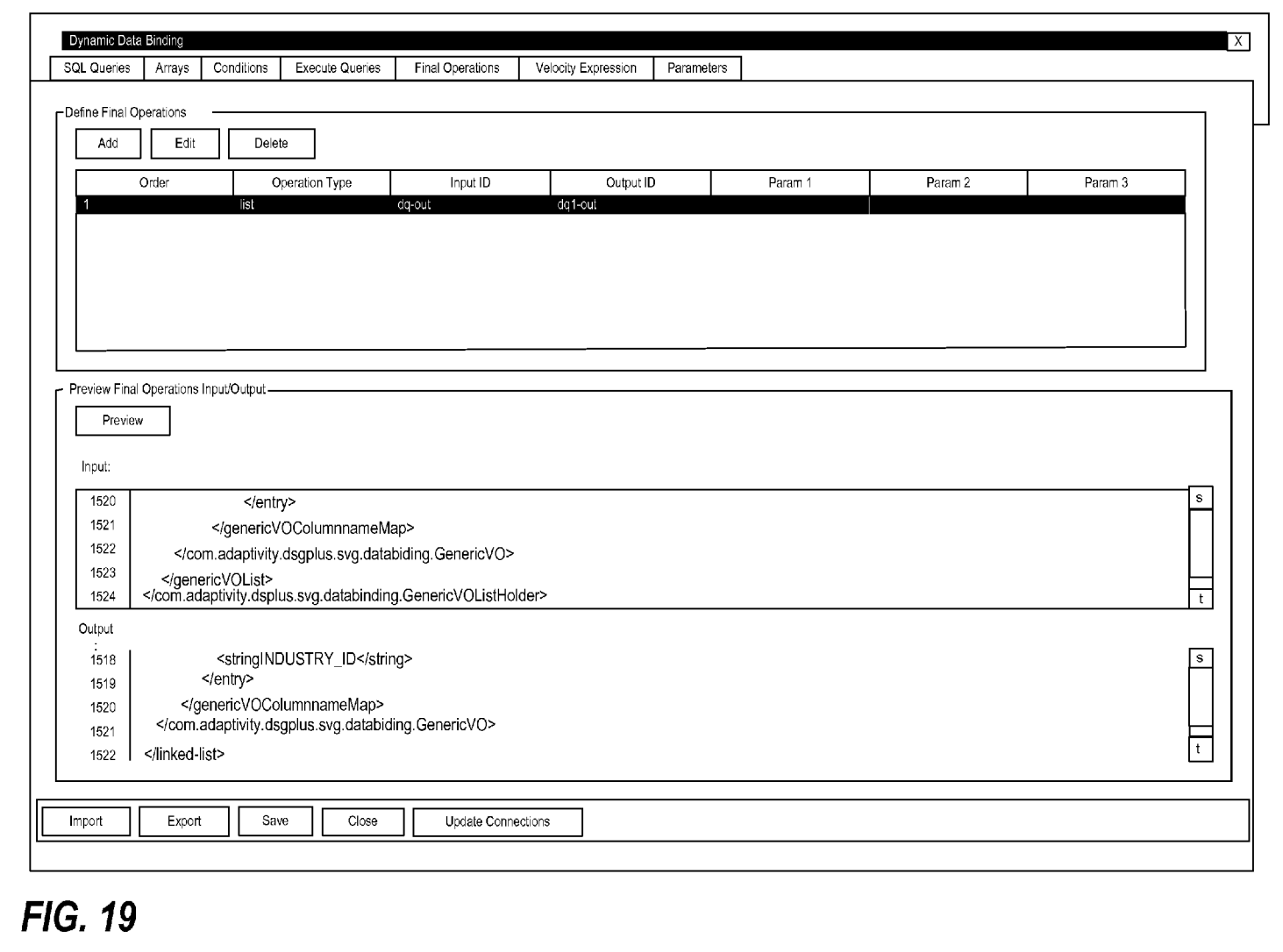

Preferably, the user interface is configured to display a preview for both before and after application of such operations. FIG. 19 illustrates a preview of generated code both prior to, and subsequent to, modification in accordance with a list operation.

Figure 20:
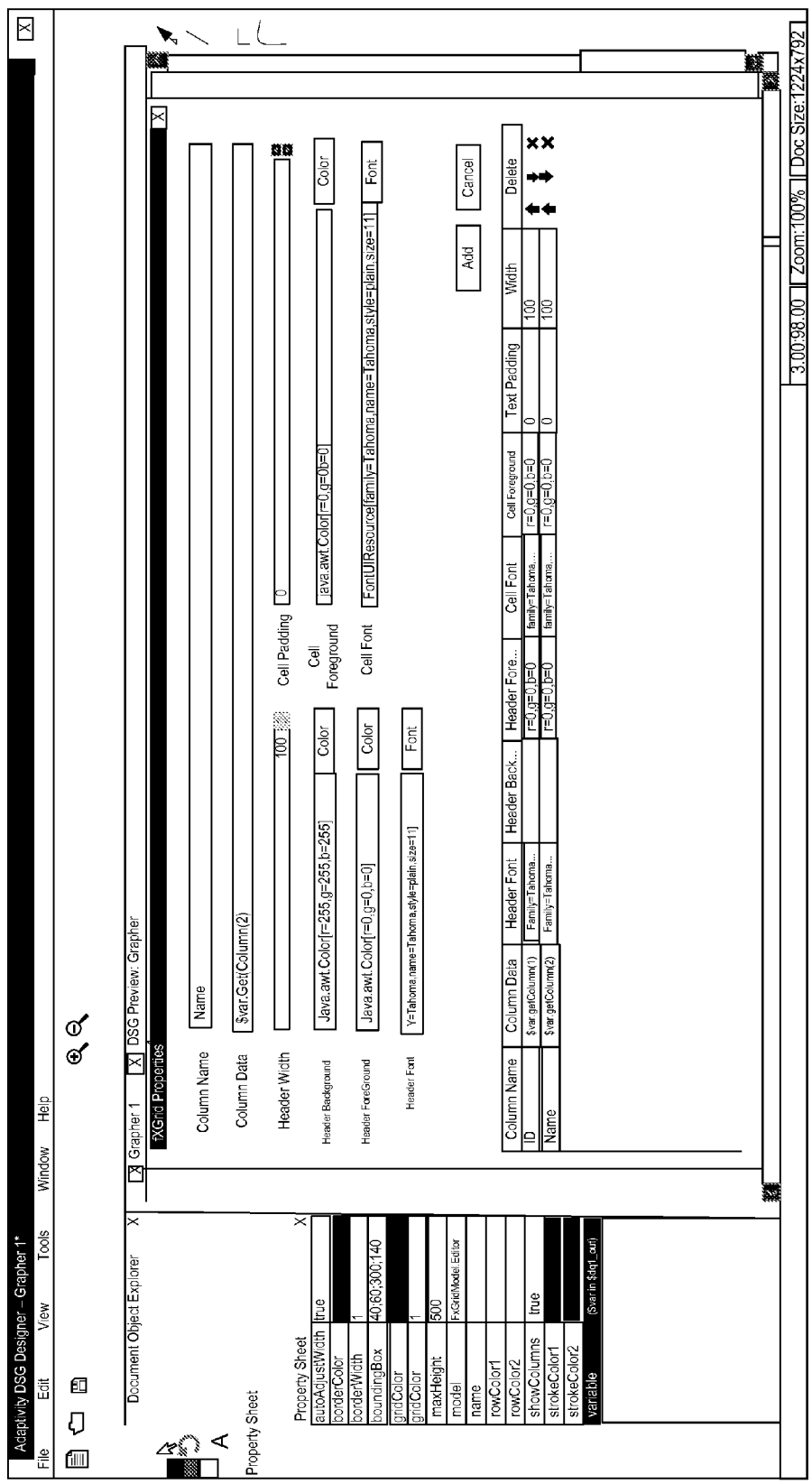
FIG. 20 illustrates how a variable property can be associated with the output from an operation.

The output from this list operation can then be utilized in the FxGrid DSG component of FIG. 13. The FxGrid component can be so configured via use of one of its properties, a variable property. FIG. 20 illustrates how the variable property can be associated with the output from this list operation via reference to the "dq1_out" output ID from the list operation (as illustrated, reference is specifically made to "dq1_out" as a variable by referencing "$var in $dq1_out").

A user interface of the exemplary editor further allows for specification of various properties of the FxGrid component, including columns of the FxGrid component. Each column can be associated with dynamic data from the source identified by the variable property. FIG. 20 illustrates use of the interface to define two columns, an "ID" column associated with data from a first column of the "dq1_out" source, and a "NAME" column with data from a second column of the "dq1_out" source. The user interface preferably allows for formatting of the FxGrid and for each column of the FxGrid to be set via properties.

Figure 21:
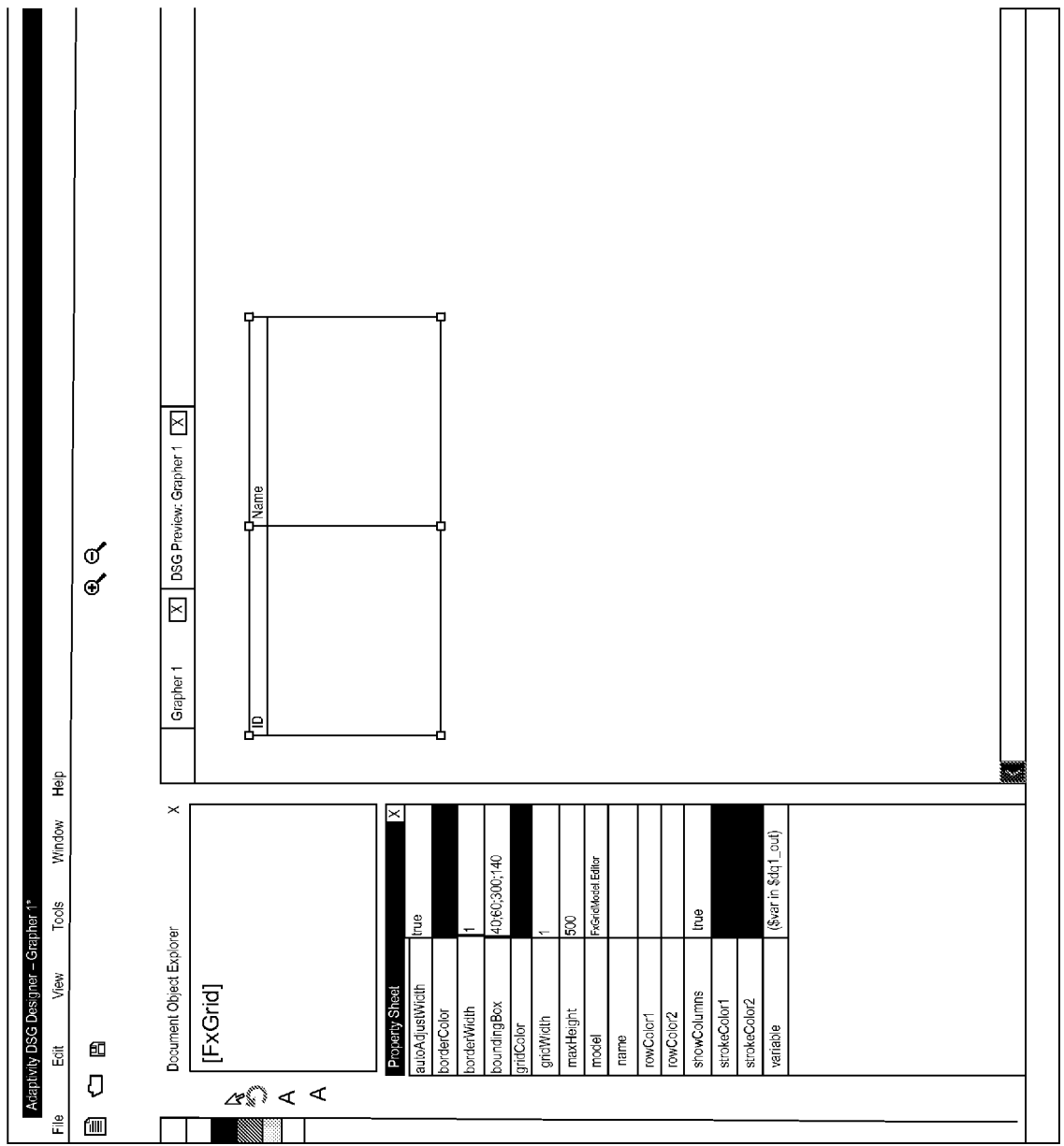
FIG. 21 illustrates a tab displaying a component defined via the user interface of FIG. 20.
Figure 22:
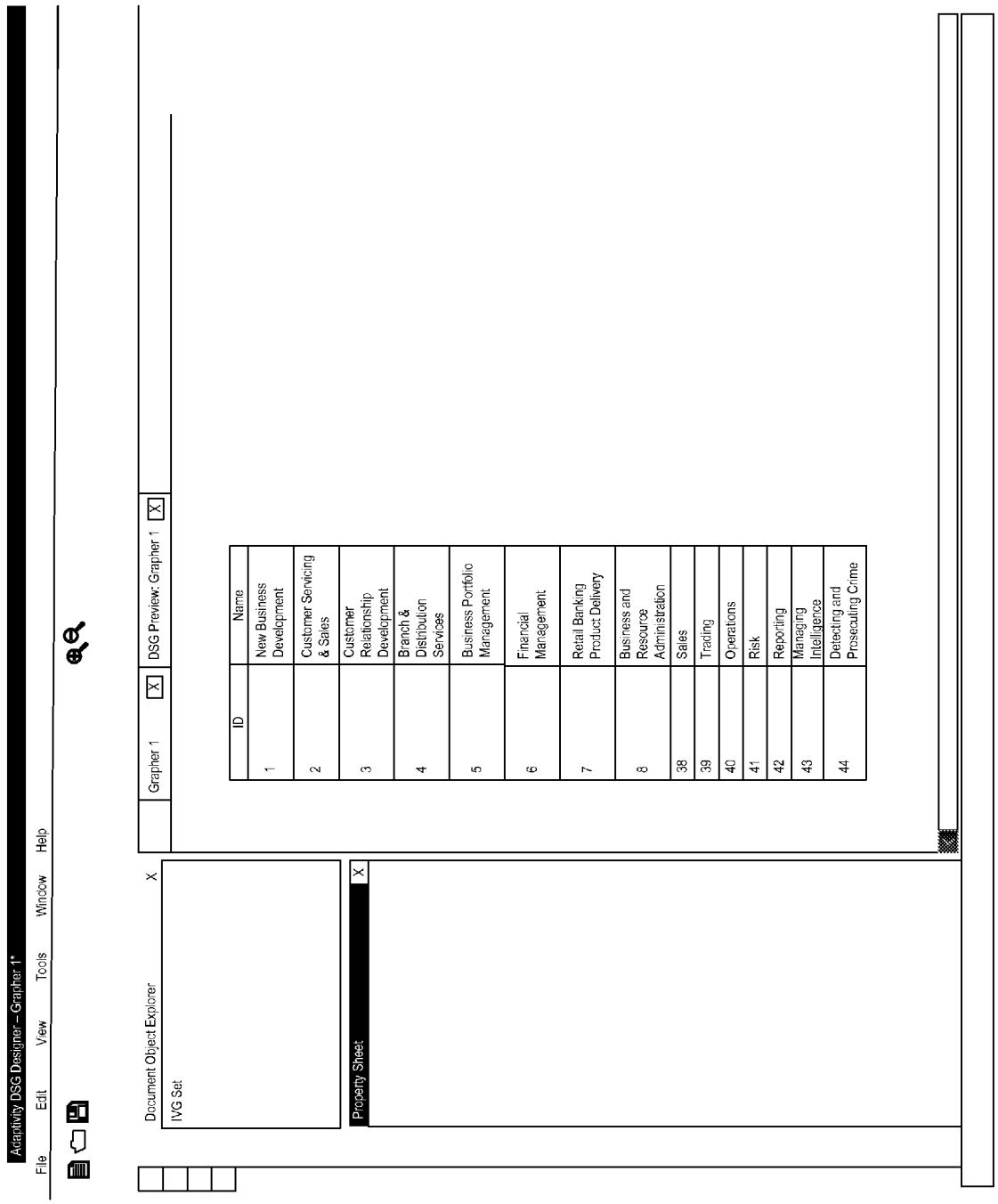
FIG. 22 illustrates a tab displaying a dynamic preview of a component rendered with data from a source.

In a preferred implementation, the editor includes a plurality of tabs providing various views of defined DSG components. FIG. 21 illustrates a first tab displaying the FxGrid component defined via the user interface of FIG. 20. In this view, the structure of the FxGrid component is visible, but no dynamic data is displayed. In contrast, FIG. 22 illustrates a second tab displaying a dynamic preview of the FxGrid component rendered with data from the "dq1_out" source.

Figure 28:
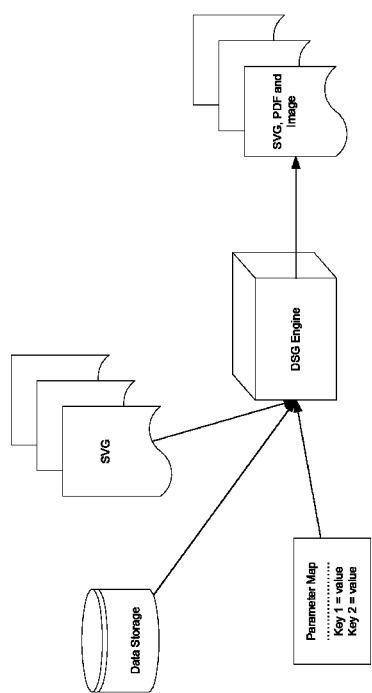
FIG. 28 illustrates how code input, input from a data source, and a parameter map can be utilized by a dynamic server graphic engine to generate output.

Based on the user's actions in creating this FxGrid component, DSG source code for such component is generated. FIG. 23 illustrates DSG source code for this FxGrid component. This source code can be utilized by a vector graphics engine to generate dynamic vector graphics in general accordance with the description herein. FIG. 28 illustrates how code input, input from a data source, and a parameter map can be utilized by a dynamic server graphic engine to generate a server vector graphic, .pdf, or image output.

Just as the editor can be utilized to create a dynamic vector graphic comprising an FxGrid component, more complex graphics can be built comprising multiple components utilizing multiple data sources. In preferred implementations, such components might include a FText component for formatted text, a FxGrid component representing a fixed column grid, a DGrid component representing a dynamic column grid, a Stack component representing a stack of other components, a List component, an Array component that is similar to the FxGrid component but supports scaling, and chart components, which may support, for example, pie, radar, and bar charts.

Figure 24A:
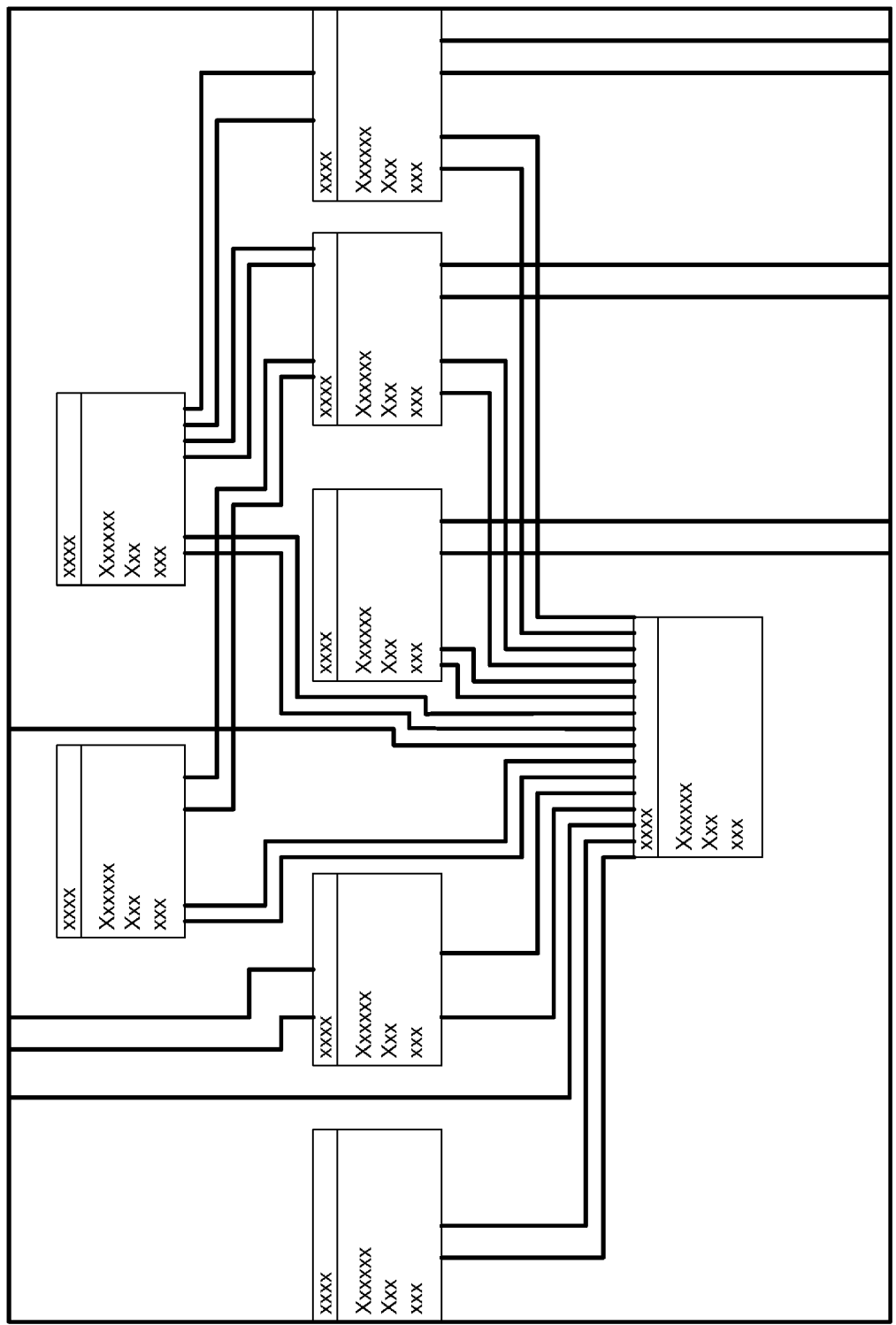
Figure 24B:
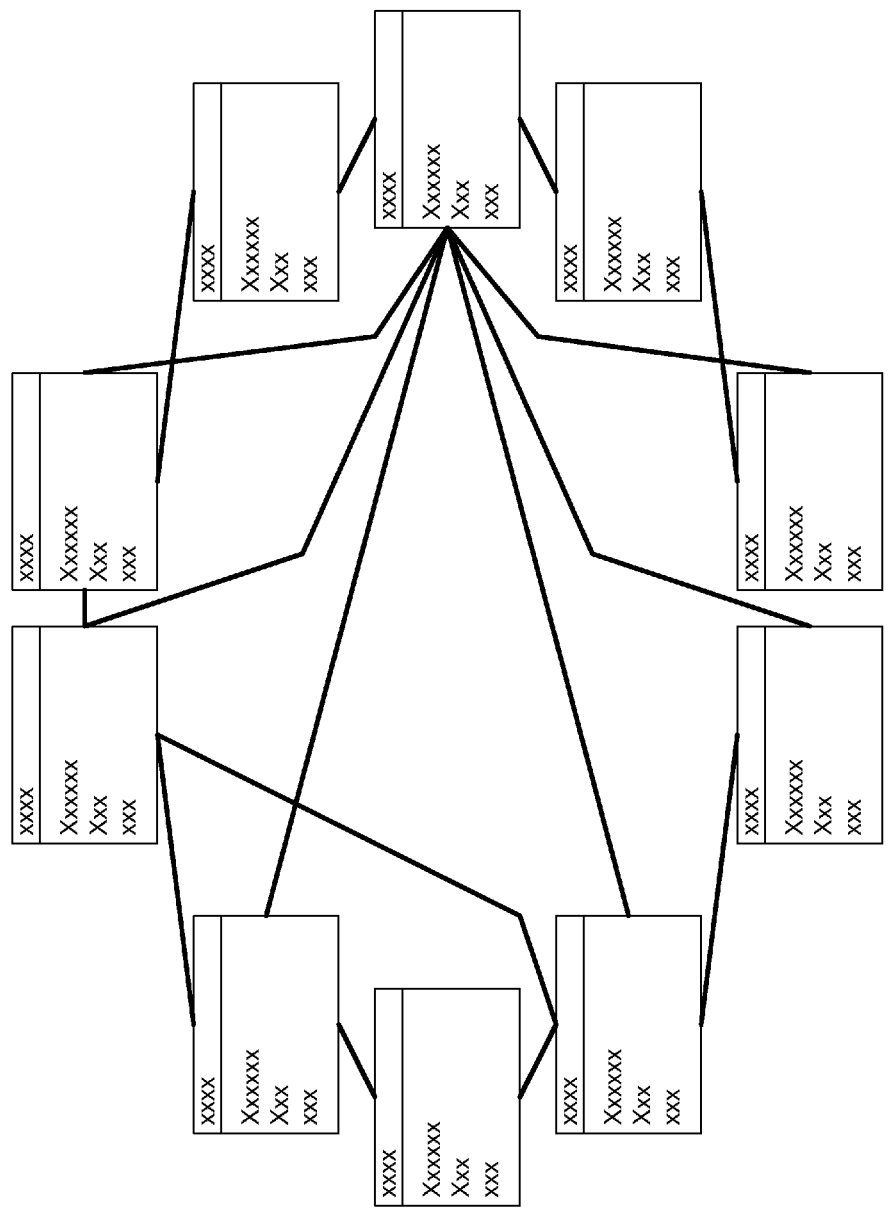
Figure 24C:
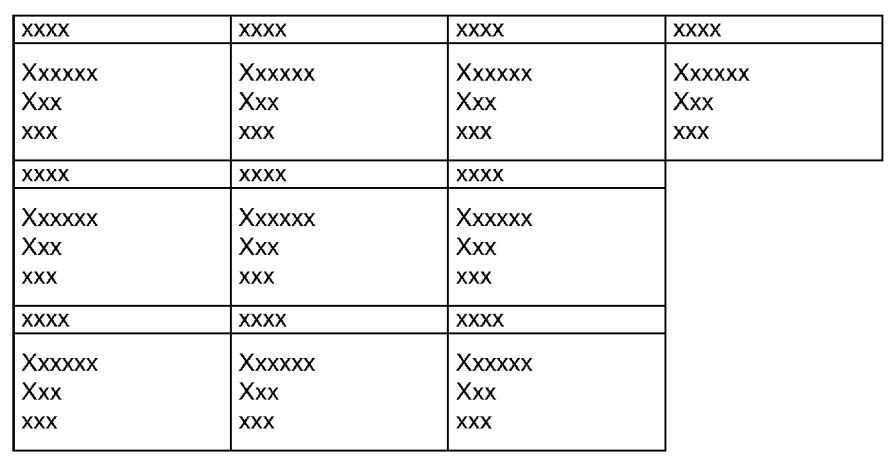

At least some preferred implementations may additionally include a layout component which may be utilized to organize data and/or multiple other components according to predefined layouts, such as, for example, a hierarchical layout, a grid layout, or a circular layout. FIGS. 24A-C illustrates the same data displayed in three different layouts. Preferably, a layout can be selected by setting a layout type property, as illustrated in FIG. 25.

In one or more preferred implementations, control components are utilized which allow third party programs and reports to be included in a dynamic graphic. For example, Microsoft reporting functionality might be incorporated into a dynamic graphic via use of a control that is placed on the canvas of the dynamic graphic. In preferred implementations, other third party programs, reports, and tools can similarly be incorporated into a dynamic graphic via a control. Preferably, such a control is implemented by wrapping such other program, report, or tool in tags specific to the dynamic graphic, e.g. DSG tags as described hereinabove. In some implementations, then, when a dynamic graphic containing such a control is later loaded, a handoff to a program responsible for rendering a report or other content occurs, and the results from that other program are then incorporated into a canvas of the dynamic graphic.

Further, at least some preferred implementations may utilize an include component, which allows for the inclusion of other files as a resource. For example, multipage DSG graphics may be created which include header and footer sections comprising include components referencing files to be utilized as header and footer images. In such an instance, the header and footer images would be present on each page of the DSG graphic, as illustrated in FIG. 26.

Generally, a single DSG page can be utilized to render results that span multiple pages. Controls, or components, utilized with DSG may be pagination enabled, i.e. configured to span multiple pages as needed. In at least some preferred implementations, one or more controls that are pagination enabled may be laid out with one or more controls that are not pagination enabled. For example, a first control A that is pagination enabled may be laid out in a left column, and a second control B that is not pagination enabled may be laid out in a right column. The first control A may include four pages worth of content to display. In preferred implementations, the first control A could be displayed in the left column on four pages, while the second control B would only be displayed in the right column on page one, as illustrated in FIG. 27A. Alternatively, the content of the second control B could be duplicated on each page, as illustrated in FIG. 27B. In at least some preferred implementations, a user configurable setting allows a user to select how controls that are not pagination enabled are displayed.

One or more methods comprising steps for generating code that can be utilized to render dynamic graphics is described hereinabove. In at least some implementations, each of these steps is performed, or confirmed, manually by a user using a user interface of an editor tool. In at least some preferred implementations, however, one, some or all of these steps are performed automatically without user input. In at least some preferred implementations, a user interface streamlines this process to enable less technologically savvy users to easily create and edit graphic templates.

Exemplary embodiments of the present invention are described above. No element, act, or instruction used in this description should be construed as important, necessary, critical, or essential to the invention unless explicitly described as such.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of rendering a dynamic graphic utilizing a vector graphics engine comprising:
   receiving, at a vector graphics engine loaded on a computing device, a graphic template; wherein the graphics template is enabled to contain complex compound primitives and wherein the vector graphics engine is enabled to convert the complex compound primitives into vector graphics output; wherein the complex compound primitive contains code; wherein the code in the complex compound primitive is enabled to be translated by the vector graphics engine into a scalable vector graphics format; wherein the complex primitive supports inheritance to enable creation of additional layers and by enabling the complex compound primitive to be extended in another complex compound primitive that inherits an object of the complex compound primitive; wherein the code is enabled to be converted into high level constructs; wherein the high level constructs include an array construct, grid construct, list construct, and stack construct;

receiving, at the vector graphics engine loaded on the computing device, a data template; wherein the vector graphics engine is enabled to read data from data sources identified in the data template including being enabled to read data from a database; binding, in a data binding process executed by a processor of the computing device, data identified via the data template to vector graphic content identified by the graphic template; and generating, by the processor of the computing device, vector graphic output that conforms to a particular format, the vector graphic output including the bound data identified via the data template in vector graphic form in accordance with the graphic template.

2. The method of claim 1, wherein the particular format that the vector graphic output conforms to is the scalable vector graphic (SVG) standard.

3. The method of claim 1, wherein the graphic template comprises a plurality of other graphic templates.

4. The method of claim 1, wherein the graphic template comprises a plurality of other graphic templates associated together in an embedded hierarchy.

5. The method of claim 1, wherein the method includes a step of parsing, by the vector graphics engine loaded on the computing device, source for one or more tags existing in a special namespace.

6. The method of claim 5, wherein the method includes a step of matching such one or more tags to one or more complex compound primitives programmatically enabled within the vector graphics engine loaded on the computing device.

7. The method of claim 1, wherein the vector graphics engine loaded on the computing device is configured to convert code representative of high level constructs into the particular format.

8. The method of claim 7, wherein the high level constructs include an array construct.

9. The method of claim 7, wherein the high level constructs include a grid construct.

10. The method of claim 7, wherein the high level constructs include a list construct.

11. The method of claim 7, wherein the high level constructs include a stack construct.

12. The method of claim 1, wherein the vector graphics engine is configured to pass through markup standard to the particular format.

13. The method of claim 1, wherein the computing device is connected to a network.

14. The method of claim 13, wherein the vector graphics engine loaded on the computing device is configured to process received data asynchronously.

15. The method of claim 13, wherein the vector graphics engine loaded on the computing device is configured to process received data synchronously.

16. A method of dynamically generating a graphic comprising:

receiving, at a vector graphics engine loaded on a server system, graphic template input; wherein the graphics template is enabled to contain complex compound primitives and wherein the vector graphics engine is enabled to convert the complex compound primitives into vector graphics output;

receiving, at the vector graphics engine loaded on the server system, data template input; wherein the vector graphics engine is enabled to read data from data sources identified in the data template including being enabled to read data from a database; wherein the complex compound primitive contains code; wherein the code in the complex compound primitive is enabled to be translated by the vector graphics engine into a scalable vector graphics format; wherein the complex primitive supports inheritance to enable creation of additional layers by enabling the complex compound primitive to be extended in another complex compound primitive that inherits an object of the complex compound primitive; wherein the code is enabled to be converted into high level constructs; wherein the high level constructs include an array construct, grid construct, list construct, and stack construct; and generating, at the server system, code in a standard format representative of a vector graphic, said generating comprising;

identifying a special tag associated with the vector graphics engine, converting code associated with this tag from a first format associated with the vector graphics engine to a second standardized format, and binding data content based on the received data template input to graphic content based on the received graphic template input.

17. A computer program product comprising:

a non-transitory computer readable medium encoded with computer executable program code, the code configured to enable the execution of:

receiving, at a vector graphics engine loaded on a server system, graphic template input; wherein the graphics template is enabled to contain complex compound primitives and wherein the vector graphics engine is enabled to convert the complex compound primitives into vector graphics output; wherein the complex compound primitive contains code; wherein the code in the complex compound primitive is enabled to be translated by the vector graphics engine into a scalable vector graphics format; wherein the complex primitive supports inheritance to enable creation of additional layers by enabling the complex compound primitive to be extended in another complex compound primitive that inherits an object of the complex compound primitive; wherein the code is enabled to be converted into high level constructs; wherein the high level constructs include an array construct, grid construct, list construct, and stack construct;

receiving, at the vector graphics engine loaded on the server system, data template input; wherein the vector graphics engine is enabled to read data from data sources identified in the data template including being enabled to read data from a database; and generating, at the server system, code in a standard format representative of a vector graphic, said generating comprising;

identifying a special tag associated with the vector graphics engine, converting code associated with this tag from a first format associated with the vector graphics engine to a second standardized format, and binding data content based on the received data template input to graphic content based on the received graphic template input.

18. A computer program product comprising:

a non-transitory computer readable medium encoded with computer executable program code, the code configured to enable the execution of:

receiving, at a vector graphics engine loaded on a computing device, a graphic template; wherein the graphics template is enabled to contain complex compound primitives and wherein the vector graphics engine is enabled to convert the complex compound primitives into vector graphics output; wherein the complex compound primitive contains code; wherein the code in the complex compound primitive is enabled to be translated by the vector graphics engine into a scalable vector graphics format; wherein the complex primitive supports inheritance to enable creation of additional layers by enabling the complex compound primitive to be extended in another complex compound primitive that inherits an object of the complex compound primitive; wherein the code is enabled to be converted into high level constructs; wherein the high level constructs include an array construct, grid construct, list construct, and stack construct;

receiving, at the vector graphics engine loaded on the computing device, a data template; wherein the vector graphics engine is enabled to read data from data sources identified in the data template including being enabled to read data from a database;

binding, in a data binding process executed by a processor of the computing device, data identified via the data template to vector graphic content identified by the graphic template; and generating, by the processor of the computing device, vector graphic output that conforms to a particular format, the vector graphic output including the bound data identified via the data template in vector graphic form in accordance with the graphic template.

19. The method of claim 18, wherein the particular format that the vector graphic output conforms to is the scalable vector graphic (SVG) standard.

20. The method of claim 19, wherein the graphic template comprises a plurality of other graphic templates.

* * * * *